United States Patent
Wang et al.

(10) Patent No.: US 11,206,095 B1
(45) Date of Patent: Dec. 21, 2021

(54) TIMING SYNCHRONIZATION FOR CLOCK SYSTEMS WITH ASYMMETRIC PATH DELAY

(71) Applicant: Equinix, Inc., Redwood City, CA (US)

(72) Inventors: Lanfa Wang, Sunnyvale, CA (US); Danjue Li, Dublin, CA (US)

(73) Assignee: Equinix, Inc., Redwood City, CA (US)

( * ) Notice: Subject to any disclaimer, the term of this patent is extended or adjusted under 35 U.S.C. 154(b) by 112 days.

(21) Appl. No.: 16/728,465

(22) Filed: Dec. 27, 2019

Related U.S. Application Data

(60) Provisional application No. 62/822,466, filed on Mar. 22, 2019.

(51) Int. Cl.
*H04J 3/06* (2006.01)
*H04W 56/00* (2009.01)

(52) U.S. Cl.
CPC .......... *H04J 3/0673* (2013.01); *H04J 3/0667* (2013.01); *H04W 56/001* (2013.01); *H04W 56/002* (2013.01)

(58) Field of Classification Search
CPC ...... H04J 3/0673; H04J 3/0658; H04J 3/0667; H04J 2011/0096; H04J 3/06; H04W 56/002; H04W 56/001
See application file for complete search history.

(56) References Cited

U.S. PATENT DOCUMENTS

| 7,475,272 B2 | 1/2009 | Carlson et al. |
|---|---|---|
| 7,602,873 B2 | 10/2009 | Eidson |
| 7,876,791 B2 | 1/2011 | Jung et al. |
| 8,384,590 B2 | 2/2013 | Huang et al. |
| 8,467,487 B2 | 6/2013 | Garner et al. |

(Continued)

FOREIGN PATENT DOCUMENTS

| DE | 102017127431 A1 | 5/2018 |
|---|---|---|
| EP | 2947795 A1 | 11/2015 |

(Continued)

OTHER PUBLICATIONS

Mellanox et al, "Multi-Path Time Synchronization draft-ietf-tictoc-multi-path-synchronization-07.txt", IETF 2016 (Year: 2016).*

(Continued)

*Primary Examiner* — Omer S Mian
(74) *Attorney, Agent, or Firm* — Shumaker & Sieffert, P.A.

(57) ABSTRACT

Techniques are disclosed for performing time synchronization for a plurality of computing devices that exhibit asymmetric path delay. In one example, processing circuitry receives data indicative of a graph comprising a plurality of nodes and vertices, wherein each node represents a clock and each vertex represents a bidirectional path between two clocks. Each bidirectional path has a first path delay in a first direction that is different from a second path delay in a second direction. The processing circuitry determines one or more closed loops in the graph and a path delay of the closed loop. The processing circuitry applies a minimization function to the path delay of each closed loop to determine values for the first and second path delays of each bidirectional path. The processing circuitry applies, based on the values for the first and second path delays of each bidirectional path, a time correction to a clock.

21 Claims, 12 Drawing Sheets

(56) References Cited

U.S. PATENT DOCUMENTS

| | | | |
|---|---|---|---|
| 8,526,333 | B2 | 9/2013 | Li et al. |
| 8,549,341 | B2 | 10/2013 | Shahid et al. |
| 8,644,348 | B2 | 2/2014 | Zampetti |
| 8,705,578 | B2 | 4/2014 | Yanbin et al. |
| 9,515,756 | B2 | 12/2016 | Khoury et al. |
| 9,712,435 | B2 | 7/2017 | Teng et al. |
| 9,886,267 | B2 | 2/2018 | Maheshwari et al. |
| 9,887,876 | B2 | 2/2018 | Kumar et al. |
| 9,948,552 | B2 | 4/2018 | Teng et al. |
| 10,015,268 | B2 | 7/2018 | Rao et al. |
| 10,116,499 | B2 | 10/2018 | Kumar et al. |
| 10,129,078 | B2 | 11/2018 | Kumar et al. |
| 10,230,571 | B2 | 3/2019 | Rangasamy et al. |
| 2002/0186716 | A1 | 12/2002 | Eidson |
| 2003/0117899 | A1 | 6/2003 | Eidson |
| 2006/0203851 | A1 | 9/2006 | Eidson |
| 2007/0147265 | A1 | 6/2007 | Eidson |
| 2007/0147435 | A1 | 6/2007 | Hamilton et al. |
| 2007/0147562 | A1 | 6/2007 | Eidson |
| 2010/0074383 | A1 | 3/2010 | Lee et al. |
| 2011/0064091 | A1 | 3/2011 | Darras et al. |
| 2011/0268097 | A1* | 11/2011 | Agrawala ........... H04W 56/002 370/338 |
| 2013/0209096 | A1 | 8/2013 | Le Pallec et al. |
| 2014/0143407 | A1* | 5/2014 | Zhang ................ H04L 67/42 709/224 |
| 2019/0068438 | A1 | 2/2019 | Kumar et al. |
| 2019/0356402 | A1 | 11/2019 | Hummen et al. |

FOREIGN PATENT DOCUMENTS

| | | |
|---|---|---|
| WO | 2012038644 A1 | 3/2012 |
| WO | 2013048770 A1 | 4/2013 |

OTHER PUBLICATIONS

Wang et al., "A Nonlinear Model for Time Synchronization", Workshop on Synchronization and Timing Services, 2019 (Year: 2019).*

Pathak et al., "A Measurement Study of Internet Delay Asymmetry," Passive and Active Network Measurement. PAM 2008. Lecture Notes in Computer Science, vol. 4979, Apr. 29-30, 2008,10 pp.

Mani et al., "A System for Clock Synchronization in an Internet of Things," Computer Science Networking and Internet Architecture, Jun. 7, 2018, 18 pp.

"Clock Synchronization in a Network with Asymmetric Delays," Computer Science Stack Exchange, retrieved from https://cs.stackexchange.com/questions/103/clock-synchronization-in-a-network-with-asymmetric-delayson Jan. 18, 2019, 19 pp.

Flammini et al., "Clock Synchronization of Distributed, Real-Time, Industrial Data Acquisition Systems," Data Acquisition, Chapter 3, Sep. 2010, pp. 41-62.

Rahman, "Delay Asymmetry Correction Model for IEEE 1588 Synchronization Protocol," 2014 IEEE 28th International Conference on Advanced Information Networking and Applications, May 13-16, 2014, 164 pp.

Shpiner et al., "Multi-Path Time Synchronization," draft-ietf-tictoc-multi-path-synchronization-06.txt, Network Working Group, Internet Draft, Oct. 6, 2016, 17 pp.

Jansweijer et al., "Measuring Propagation Delay Over a 1.25 Gbps Bidirectional Data Link," National Institute for Subatomic Physics, May 31, 2010, 24 pp.

Belhaj et al., "Modeling and Prediction of the Internet End-to End Delay using Recurrent Neural Networks," Journal of Networks, vol. 4, No. 6, Aug. 2009, pp. 529-535.

Attiya et al., "Optimal Clock Synchronization Under Energy Constraints in Wireless Ad-Hoc Networks," Principles of Distributed Systems. OPODIS 2005. Lecture Notes in Computer Science, vol. 3974, Dec. 12-15, 2005, pp. 221-234.

Shpiner et al., "Multi-Path Time Synchronization," Internet Engineering Task Force (IETF), RFC 8039, Dec. 2016, 17 pp.

Dai et al., "TSync : A Lightweight Bidirectional Time Synchronization Service for Wireless Sensor Networks," ACM Sigmobile Mobile Computing and Communications Review, Jan. 2004, 12 pp.

Mills et al., "Network Time Protocol Version 4: Protocol and Algorithms Specification," Internet Engineering Task Force (IETF), RFC 5905, Jun. 2010, 110 pp.

Shankarkumar et al., "Precision Time Protocol Version 2 (PTPv2) Management Information Base," Internet Engineering Task Force (IETF), RFC 8173, Jun. 2017, 64 pp.

"IEEE Standard for a Precision Clock Synchronization Protocol for Networked Measurement and Control Systems," EEE Instrumentation and Measurement Society, IEEE Std 1588-2008, Jul. 2008, 289 pp.

Geng et al., "Self-Programming Networks: Architecture and Algorithms," Fifty-Fifth Annual Allerton Conference, Oct. 3-6, 2017, pp. 745-752.

Mulls et al., "Internet Time Synchronization: The Network Time Protocol," IEEE Transactions on Communications, vol. 39, No. 10, Oct. 1991, pp. 1482-1493.

* cited by examiner

Table 2: Summary of Performance with $\lambda = 0.1$

| Distribution | $\sigma_w$True | $\sigma_w$Solution | $\sigma_w$Error |
|---|---|---|---|
| Normal | 0.096 | 0.0777 | 0.054 |
| Uniform | 0.028 | 0.0226 | 0.016 |

FIG. 6

TIMING SYNCHRONIZATION FOR CLOCK SYSTEMS WITH ASYMMETRIC PATH DELAY

This application claims the benefit of U.S. Provisional Application No. 62/822,466, which was filed on Mar. 22, 2019. The entire content of Application No. 62/822,466 is incorporated herein by reference.

TECHNICAL FIELD

This disclosure generally relates to time synchronization for computer networking systems.

BACKGROUND

A synchronization system, in general, synchronizes clocks of multiple devices based on the clock of a chosen master device (also referred to as a "primary" device or a "leader" device). The master device is a computing device that gets time synchronization data from other master devices or intelligent engines deployed either inside or outside of the synchronization system, such as a global positioning system (GPS).

Clock synchronization is the process of coordinating otherwise independent clocks, such as the clocks of computing devices connected on a network. Even when initially set accurately, real clocks will differ after some amount of time due to clock drift due to the fact that even the most accurate clocks count time at slightly different rates. In network computing and distributed computing environments, each computing device must realize the same global time. Computing devices that are not accurately synchronized may treat the same event as happening in the past, concurrently, or in the future, thereby exhibit unpredictable and unreliable behavior. This is increasingly important in high-speed networking because there may be numerous inter-connected systems that depend on extremely precise timing to function correctly.

In many applications, including but not limited to financial, scientific, military, programmatic advertising, and gaming industries, time synchronization may be beneficial. For instance, such knowledge would be used to define trade orders in high-frequency trading systems and gamers response in multi-user games.

SUMMARY

In general, the disclosure describes techniques for performing time synchronization for a plurality of computing devices that may exhibit asymmetric path delay between the plurality of computing devices. The techniques do not assume symmetrical signal propagation delay for any bidirectional path between two computing devices, e.g., the time required for a signal sent from a first computing device to reach a second computing device is the same as the time required for a signal sent from the second computing device to reach the first computing device. Real-world bidirectional paths between computing devices exhibit asymmetric delay, which, if not accounted for in clock synchronization between two devices, may impair clock synchronization.

As described herein, methods, systems, and devices are disclosed for performing time synchronization for a plurality of computing devices on a network that exhibit asymmetric delay along paths between the plurality of computing devices. As used herein, the terms "path delay" and "path length" may be used interchangeably. In one example, a computing device receives a graph, wherein nodes of the graph represent one or more clocks of one or more computing devices of the network and vertices of the graph represent one or more bidirectional paths between the clocks. Each bidirectional path exhibits an asymmetric delay, e.g., the bidirectional path exhibits a first path delay in a first direction between the two clocks that is different from a second path delay in a second direction between the two clocks. The computing device determines closed loops in the graph and a corresponding path delay for each of the closed loops. Further, the computing device applies a minimization function to the path delay of each of the closed loops to determine values for the path delay in each direction of each bidirectional path between the clocks. Based on the values for the path delay in each direction of each bidirectional path, the computing device applies a time correction to correct a clock offset of at least one clock of the plurality of clocks.

The techniques of the disclosure provide one or more specific technical improvements to the computer-related field of time synchronization for computer networking systems. Further, the techniques of the disclosure provide specific practical applications to the field of time synchronization for computer networking systems. For example, the techniques of the disclosure allow for calculating and accounting for asymmetric delay along bidirectional paths between clocks of a plurality of computing devices on a network. Furthermore, the techniques of the disclosure may allow for the efficient calculation of asymmetric delay, even for an arbitrarily large network that has an arbitrarily large number of bidirectional paths between computing devices. Such techniques may allow for much more accurate time synchronization between the clocks of computing devices as compared to other methods.

In one example, this disclosure describes a method for time synchronization for a plurality of clocks on a network, comprising: receiving, by processing circuitry of a computing device, data indicative of a graph comprising a plurality of nodes and a plurality of vertices, wherein each node includes a clock of the plurality of clocks and each vertex includes a bidirectional path between two clocks of the plurality of clocks, and wherein the bidirectional path is associated with a first path delay in a first direction of the bidirectional path between the two clocks that is different from a second path delay in a second direction of the bidirectional path between the two clocks; determining, by processing circuitry, one or more closed loops in the graph, each of the one or more closed loops representing a traversal of the graph starting from a node of the plurality of nodes and returning to the node of the plurality of nodes; determining, by the processing circuitry and for each closed loop of the one or more closed loops in the graph, a path delay for the closed loop; applying, by the processing circuitry, a minimization function to the path delay for each closed loop of the one or more closed loops to determine values for the first path delay and the second path delay for each bidirectional path represented by each vertex of the graph; and applying, by the processing circuitry and based on the values for the first path delay and the second path delay of each bidirectional path represented by each vertex of the graph, a time correction to correct a clock offset of at least one of the plurality of clocks.

In another example, this disclosure describes a computing device comprising: a storage medium; and processing circuitry configured to: receive data indicative of a graph comprising a plurality of nodes and a plurality of vertices, wherein each node includes a clock of the plurality of clocks and each vertex includes a bidirectional path between two clocks of the plurality of clocks, and wherein the bidirectional path is associated with a first path delay in a first direction of the bidirectional path between the two clocks that is different from a second path delay in a second direction of the bidirectional path between the two clocks; determine one or more closed loops in the graph, each of the one or more closed loops representing a traversal of the graph starting from a node of the plurality of nodes and returning to the node of the plurality of nodes; determine, for each closed loop of the one or more closed loops in the graph, a path delay for the closed loop; apply a minimization function to the path delay for each closed loop of the one or more closed loops to determine values for the first path delay and the second path delay for each bidirectional path represented by each vertex of the graph; and apply, based on the values for the first path delay and the second path delay of each bidirectional path represented by each vertex of the graph, a time correction to correct a clock offset of at least one of the plurality of clocks.

In another example, this disclosure describes a non-transitory computer-readable medium comprising instructions that, when executed, cause processing circuitry of a computing device to: receive data indicative of a graph comprising a plurality of nodes and a plurality of vertices, wherein each node includes a clock of the plurality of clocks and each vertex includes a bidirectional path between two clocks of the plurality of clocks, and wherein the bidirectional path is associated with a first path delay in a first direction of the bidirectional path between the two clocks that is different from a second path delay in a second direction of the bidirectional path between the two clocks; determine one or more closed loops in the graph, each of the one or more closed loops representing a traversal of the graph starting from a node of the plurality of nodes and returning to the node of the plurality of nodes; determine, for each closed loop of the one or more closed loops in the graph, a path delay for the closed loop; apply a minimization function to the path delay for each closed loop of the one or more closed loops to determine values for the first path delay and the second path delay for each bidirectional path represented by each vertex of the graph; and apply, based on the values for the first path delay and the second path delay of each bidirectional path represented by each vertex of the graph, a time correction to correct a clock offset of at least one of the plurality of clocks.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

FIG. 6 is a table illustrating performance measurements for an example implementation of the techniques of the disclosure.

Like reference characters refer to like elements throughout the figures and description.

DETAILED DESCRIPTION

Figure 1:
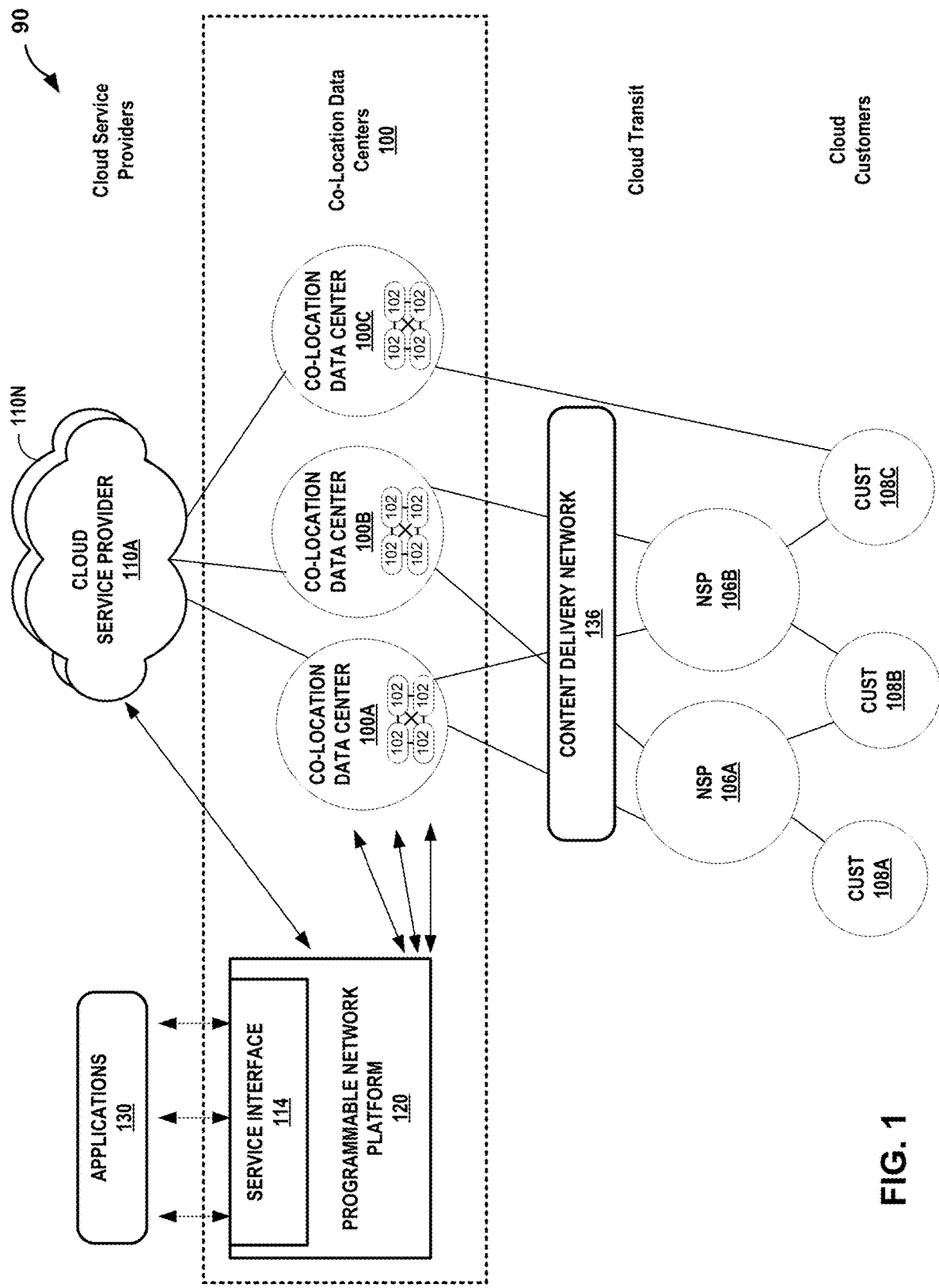
FIG. 1 is a block diagram illustrating an example system that performs time synchronization for a plurality of computing devices that exhibit asymmetric path delay between the plurality of computing devices.

FIG. 1 is a block diagram illustrating an example system 90 that performs time synchronization for a plurality of computing devices (e.g., computing devices 102 and customer devices 108A-108C, hereinafter, "customer devices 108") that exhibit asymmetric path delay between the plurality of computing devices. In general, a user such as customer 108A or a provider operator begins a user session with the portal application for engaging a co-location data center 100. As the user session makes service requests to various applications 130 within co-location data center 100, each of the applications 130 perform various sub-transactions to service the requests.

As illustrated by FIG. 1, co-location data centers 100A-100C ("co-location data centers 100") may provide an access point by which cloud-based services customers ("cloud customers") and cloud-based service providers ("cloud providers") connect to receive and provide, respectively, cloud services. A co-location data center provider may deploy instances of co-location data centers 100 in multiple different metropolitan areas, each instance of co-location data center 100 having one or more co-location data center points (not depicted). A co-location data center may offer interconnection services, such as a cloud exchange, an Ethernet exchange, an Internet exchange, or cross-connections.

Co-location data centers 100 may include a cloud exchange (e.g., a cloud exchange fabric) and thus include network infrastructure and an operating environment by which cloud customers 108A-108C (collectively, "cloud customers 108") receive cloud services from multiple cloud service providers 110A-110N (collectively, "cloud service providers 110"). Cloud customers 108 may receive cloud-based services directly via a layer 3 peering and physical connection to co-location data centers 100 or indirectly via one of network service providers 106A-106B (collectively, "NSPs 106," or alternatively, "carriers 106"). NSPs 106 provide "cloud transit" by maintaining a physical presence within co-location data centers 100 and aggregating layer 3 access from one or customers 108. NSPs 106 may peer, at layer 3, directly with co-location data centers 100, and in so doing, offer indirect layer 3 connectivity and peering to one or more customers 108 by which customers 108 may obtain cloud services from the cloud service providers 110. Co-location data centers 100, in the example of FIG. 1, are assigned an autonomous system number (ASN). Thus, co-location exchange points 129 are next hops in a path vector routing protocol (e.g., BGP) path from cloud service providers 110 to customers 108. As a result, any of co-location data centers 100 may, despite not being a transit network having one or more wide area network links and concomitant Internet access and transit policies, peer with multiple different autonomous systems via external BGP (eBGP) or other exterior gateway routing protocol in order to exchange, aggregate, and route service traffic from one or more cloud service providers 110 to customers. In other words, co-location data centers 100 may internalize the eBGP peering relationships that cloud service providers 110 and customers 108 would maintain on a pairwise basis. Rather, co-location data center 100 allows a customer 108 to configure a single eBGP peering relationship with co-location data centers 100 and receive, via the co-location data center, multiple cloud services from one or more cloud service providers 110. While described herein primarily with respect to eBGP or other layer 3 routing protocol peering between co-location data centers 100 and customer, NSP, or cloud service provider networks, co-location data centers 100 may learn routes from these networks in other way, such as by static configuration, or via Routing Information Protocol (RIP), Open Shortest Path First (OSPF), Intermediate System-to-Intermediate System (IS-IS), or other route distribution protocol.

Content delivery network ("CDN") 136 is a globally distributed network of proxy servers deployed in multiple data centers. CDN 136 acts as a point of entry for customers 108 to access co-location data center 100. CDN 136 serves content to end-users with high availability and high performance. Co-location data center 100 may enlist a CDN operator to deliver the content of co-location data center 100 to their audience of end-users. Besides better performance and availability, CDN 136 also offloads the traffic served directly from the origin infrastructure of co-location data center 100, resulting in possible cost savings for the content provider. In addition, CDN 136 provides the content provider a degree of protection from DoS attacks by using their large distributed server infrastructure to absorb the attack traffic. In some examples, customers 108 access co-location data center 100 via a browser-based web portal that CDN 136 provides to customers 108. In some examples, one or more applications 130 represent at least one portal application delivered, at least in part, by CDN 136 to users.

As examples of the above, customer 108C is illustrated as having contracted with the provider for co-location data center 100 to directly access layer 3 cloud services through CDN 136 via co-location data centers 100 and also to have contracted with NSP 106B to access layer 3 cloud services via a transit network of the NSP 106B. Customer 108B is illustrated as having contracted with multiple NSPs 106A, 106B to have redundant cloud access to CDN 136, and thus co-location data centers 100, via respective transit networks of the NSPs 106A, 106B. The contracts described above are instantiated in network infrastructure of co-location data centers 100 by L3 peering configurations within switching devices of NSPs 106 and co-location data centers 100 and L3 connections, e.g., layer 3 virtual circuits, established within co-location data centers 100 to interconnect cloud service provider 110 networks to NSPs 106 networks and customer 108 networks, all having at least one port offering connectivity within co-location data centers 100.

In some examples, co-location data center 100 allows a corresponding one of customer customers 108A, 108B of any network service providers (NSPs) or "carriers" 106A-106B (collectively, "carriers 106") or other cloud customers including customers 108C to be directly cross-connected, via a virtual layer 2 (L2) or layer 3 (L3) connection to any other customer network and/or to any of CSPs 110, thereby allowing direct exchange of network traffic among the customer networks and CSPs 110.

Carriers 106 may each represent a network service provider that is associated with a transit network by which network subscribers of the carrier 106 may access cloud services offered by CSPs 110 via the co-location data center 100. In general, customers of CSPs 110 may include network carriers, large enterprises, managed service providers (MSPs), as well as Software-as-a-Service (SaaS), Platform-aaS (PaaS), Infrastructure-aaS (IaaS), Virtualization-aaS (VaaS), and data Storage-aaS (dSaaS) customers for such cloud-based services as are offered by the CSPs 110 via the co-location data center 100.

In this way, co-location data center 100 streamlines and simplifies the process of partnering CSPs 110 and customers (via carriers 106 or directly) in a transparent and neutral manner. One example application of co-location data center 100 is a co-location and interconnection data center in which CSPs 110 and carriers 106 and/or customers 108 may already have network presence, such as by having one or more accessible ports available for interconnection within the data center, which may represent co-location data centers 100. This allows the participating carriers, customers, and CSPs to have a wide range of interconnectivity options within the same facility. A carrier/customer may in this way have options to create many-to-many interconnections with only a one-time hook up to co-location data centers 100. In other words, instead of having to establish separate connections across transit networks to access different cloud service providers or different cloud services of one or more cloud service providers, co-location data center 100 allows customers to interconnect to multiple CSPs and cloud services.

Co-location data center 100 includes a programmable network platform 120 for dynamically programming a services exchange (e.g. a cloud exchange) of the co-location data center 100 to responsively and assuredly fulfill service requests that encapsulate business requirements for services provided by co-location data center 100 and/or cloud service providers 110 coupled to the co-location data center 100. The programmable network platform 120 as described herein may, as a result, orchestrate a business-level service across heterogeneous cloud service providers 110 according to well-defined service policies, quality of service policies, service level agreements, and costs, and further according to a service topology for the business-level service.

The programmable network platform 120 enables the provider that administers the co-location data center 100 to dynamically configure and manage the co-location data center 100 to, for instance, facilitate virtual connections for cloud-based services delivery from multiple cloud service providers 110 to one or more cloud customers 108. The co-location data center 100 may enable cloud customers 108 to bypass the public Internet to directly connect to cloud services providers 110 so as to improve performance, reduce costs, increase the security and privacy of the connections, and leverage cloud computing for additional applications. In this way, enterprises, network carriers, and SaaS customers, for instance, can at least in some aspects integrate cloud services with their internal applications as if such services are part of or otherwise directly coupled to their own data center network.

Programmable network platform 120 may represent an application executing within one or more data centers of the co-location data center 100 or alternatively, off-site at a back office or branch of the cloud provider (for instance). Programmable network platform 120 may be distributed in whole or in part among the co-location data centers 100.

In the illustrated example, programmable network platform 120 includes a service interface (or "service API") 114 that defines the methods, fields, and/or other software primitives by which applications may invoke the programmable network platform 120. The service interface 114 may allow carriers 106, customers 108, cloud service providers 110, and/or the co-location data center provider programmable access to capabilities and assets of the co-location data center 100.

For example, the service interface 114 may facilitate machine-to-machine communication to enable dynamic provisioning of virtual circuits in the co-location data center for interconnecting customer and cloud service provider networks. In this way, the programmable network platform 120 enables the automation of aspects of cloud services provisioning. For example, the service interface 114 may provide an automated and seamless way for customers to establish, de-install and manage interconnection with multiple, different cloud providers participating in the co-location data center.

Further example details of a services exchange, such as a cloud-based services exchange, can be found in U.S. Provisional Patent Application No. 62/149,374, filed Apr. 17, 2015 and entitled "Cloud-Based Services Exchange;" in U.S. Provisional Patent Application No. 62/072,976, filed Oct. 30, 2014 and entitled "INTERCONNECTION PLATFORM FOR REAL-TIME CONFIGURATION AND MANAGEMENT OF A CLOUD-BASED SERVICES EXCHANGE;" and in U.S. patent application Ser. No. 15/001,766 and entitled "MULTI-CLOUD, MULTI-SERVICE DATA MODEL," each of which are incorporated herein by reference in their respective entireties. A cloud-based services exchange, or "cloud exchange" may be configured and managed to facilitate virtual connections for cloud services delivery from multiple cloud service providers to one or more cloud customers. The cloud exchange may enable cloud customers to bypass the public Internet to directly connect to cloud services providers to improve performance, reduce costs, increase the security and privacy of the connections, and leverage cloud computing for additional applications. In this way, enterprises, network carriers, and SaaS customers, for instance, can integrate cloud services with their internal applications as if such services are part of or otherwise directly coupled to their own data center network.

Applications 130 represent systems of engagement by which customers or internal operators for the co-locations data centers 100 may request services, request assets, request information regarding existing services or assets, and so forth. Each of applications 130 may represent a web portal, a console, a stand-alone application, an operator portal, a customer portal, or other application by which a user may engage programmable network platform 120.

In this example, co-location data center 100 includes a set of interconnected computing devices 102 to support the operations of co-location data center 100. Computing devices 102 may include storage systems and application servers that are interconnected via a high-speed switch fabric provided by one or more tiers of physical network switches and routers. For ease of illustration, FIG. 1 depicts three data centers 100, each of which has only a few computing devices 102. However, the techniques of the disclosure may be applied to large-scale networking systems that include dozens of data centers 100, each data center 100 having thousands of computing devices 102. Computing devices 102 may further include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other computing devices. In some examples, computing devices 102 may include top-of-rack switches, aggregation routers, and/or core routers.

Computing devices in a network may implement a clock synchronization protocol to synchronize a clock of each computing device with other computing devices on the network (e.g., a network within system 90 or the Internet). For example, a network system may implement clock synchronization protocol such as Network Time Protocol (NTP) or Precision Time Protocol (PTP) to perform clock synchronization. Further information with regard to NTP is provided in "Network Time Protocol Version 4: Protocol and Algorithms Specification," RFC5905, Internet Engineering Task Force (IETF) (June 2010), available at https://tools.ietf.org/html/rfc5905, the entire content of which is incorporated by reference. Further information with regard to PTP is provided in "Precision Time Protocol Version 2 (PTPv2) Management Information Base," RFC 8173, Internet Engineering Task Force (IETF) (June 2017), available at https://tools.ietf.org/html/rfc8173, the entire content of which is incorporated by reference.

As an example, time synchronization protocols such as NTP or PTP implement a master computing device that acts as a reference clock to provide reference timing signals to slave computing devices that synchronize their system time to the system time of the master computing device. However, NTP and PTP suffers from some accuracy issues. For example, NTP and PTP assume that timing delays for any bidirectional path between two computing devices 102 is symmetrical, e.g., the signal propagation time for a signal sent from a first computing device 102 to a second computing device 102 is the same as the signal propagation time for a signal sent from the second computing device to the first computing device. However, real-world bidirectional paths between computing devices exhibit asymmetric delay. This asymmetric delay imposes error in clock synchronization between two devices, limiting the precision with which clocks in a network may be synchronized to one another.

In accordance with the techniques of the disclosure, a computing device, such as one of computing devices 102, performs time synchronization for a plurality of computing devices 102 and 108 that exhibit asymmetric delay along paths between the plurality of computing devices. In one example, computing device 102 receives a graph, wherein nodes of the graph represent one or more clocks of one or more computing devices 102, 108 and vertices of the graph represent one or more bidirectional paths between the clocks. Each bidirectional path exhibits an asymmetric delay, e.g., the bidirectional path exhibits a first path delay in a first direction between the two clocks that is different from a second path delay in a second direction between the two clocks. As described in more detail below, the computing device 102 determines closed loops in the graph and a path delay for each of the closed loops. Further, the computing device 102 applies a minimization function to the path delay of each of the closed loops to determine a path delay in each direction of each bidirectional path between the clocks. Based on the values for the path delay in each direction of each bidirectional path, computing device 102 calculates a time synchronization offset value and applies a time correction to correct an offset of at least one clock of the plurality of clocks based on the offset value.

The techniques of the disclosure provide one or more specific technical improvements to the computer-related field of time synchronization for computer networking systems. Further, the techniques of the disclosure provide specific practical applications to the field of time synchronization for computer networking systems. For example, the techniques of the disclosure allow for the calculation of asymmetric path delay along bidirectional paths between clocks of a plurality of computing devices on a network. Furthermore, the techniques of the disclosure may allow for the efficient calculation of asymmetric delay, even for an arbitrarily large network that has an arbitrarily large number of bidirectional paths between computing devices. Such techniques may allow for much more accurate time synchronization between the clocks of computing devices as compared to conventional methods.

Programmable network platform 120 may provide a precise timing platform that enables to create unique user keys for security, authentication, and management of the service, simple service subscription, client installation, adding and removing client devices, UI-based device clock synchronization monitoring such as search by device names and IPs, historical and analytic data, precise and accurate clock synchronization with NTP and PTP on Linux and Window. The precise timing platform may also provide scalability: customers can add additional client devices anywhere where the programmable network platform 120 infrastructure is set and available for customers. The precise timing platform may also provide statistics on clock drift and access to the service historic data.

The precise timing platform may also provide highly-available, fault tolerant, horizontally scalable monitoring and synchronizes device clocks with accuracy and precision. The results of synchronization are stored in a distributed redundant database. These proprietary technologies are used to optimize device authentication. They allow for parametric tune up and the ranking of devices and connections.

In some examples, the precise timing platform provides a clock synchronization and monitoring solution targeting edge computing applications and built based on colocation infrastructure that support high performance, network reliability, redundancy, and low latency.

In the example of FIG. 1, system 1 includes a programmable network platform 120, which may connect multiple autonomous systems (not shown) and computing devices 102, in accordance with example aspects of the techniques of this disclosure.

In some examples, programmable network platform 120 may be part of a cloud-based services exchange that includes interconnection assets configured to connect a customer of the cloud-based services exchange to one or more cloud service providers (CSPs), the plurality of interconnection assets including a virtual circuit by which the customer (e.g., an enterprise customer) accesses a cloud service from a CSP. Programmable network platform 120 may also include an orchestration engine (not shown) configured to modify the interconnection assets.

In some examples, programmable network platform 120 exposes a collection of software interfaces, e.g., application programming interfaces (APIs), that allow access to capabilities and assets of the interconnection platform in a programmable fashion. As such, the software interfaces provide an extensible framework that allows software developers associated with customers and partners of the exchange to build software applications that access the interconnection platform that automatically manage interconnection with multiple cloud service providers participating in the interconnection platform. In other words, developers from network services providers, cloud service providers, managed service providers and other enterprises may use the software interfaces exposed by the interconnection platform and defined by the APIs to build custom applications and frameworks for seamless interaction with the interconnection platform to facilitate the delivery of cloud services from cloud service providers to cloud service customers. These software interfaces defined by the APIs enable machine-to-machine communication for near real-time setup and modifications of interconnections, and may also eliminate or reduce the need for human interaction for the entire interconnection setup and management process. In this way, the software interfaces provide an automated and seamless way to establish, un-install, and manage interconnection with multiple cloud providers participating in an interconnection platform.

In some examples, several master devices may be connected to one another via programmable network platform 120. In some examples, programmable network platform 120 or a cloud exchange fabric connects grand master device to master devices. Leaf-to-leaf (slave-to-slave) connections may likewise be made via programmable network platform 120. For example, in the example of FIG. 1, a computing device 102 located in co-location data center 100A may connect to a computing device 102 located in co-location data center 100B via programmable network platform 120. A cloud exchange fabric can connect a customer's leaf node device to one or more master devices, including a grand master device. Connecting master devices and slave/leaf nodes via a cloud exchange fabric (e.g., by virtual circuits) may improve precision of time synchronization, including PTP-based time synchronization. Using a cloud exchange fabric may improve resilience and reliability of the system. In other examples, rather than being connected to one another by virtual circuits via cloud exchange fabric, any of computing devices 102 (e.g., slave/leaf nodes and master devices) may be interconnected by direct wire connections (e.g., cross-connects), metro-connection, fiber connect, or connected via the Internet.

Figure 2:
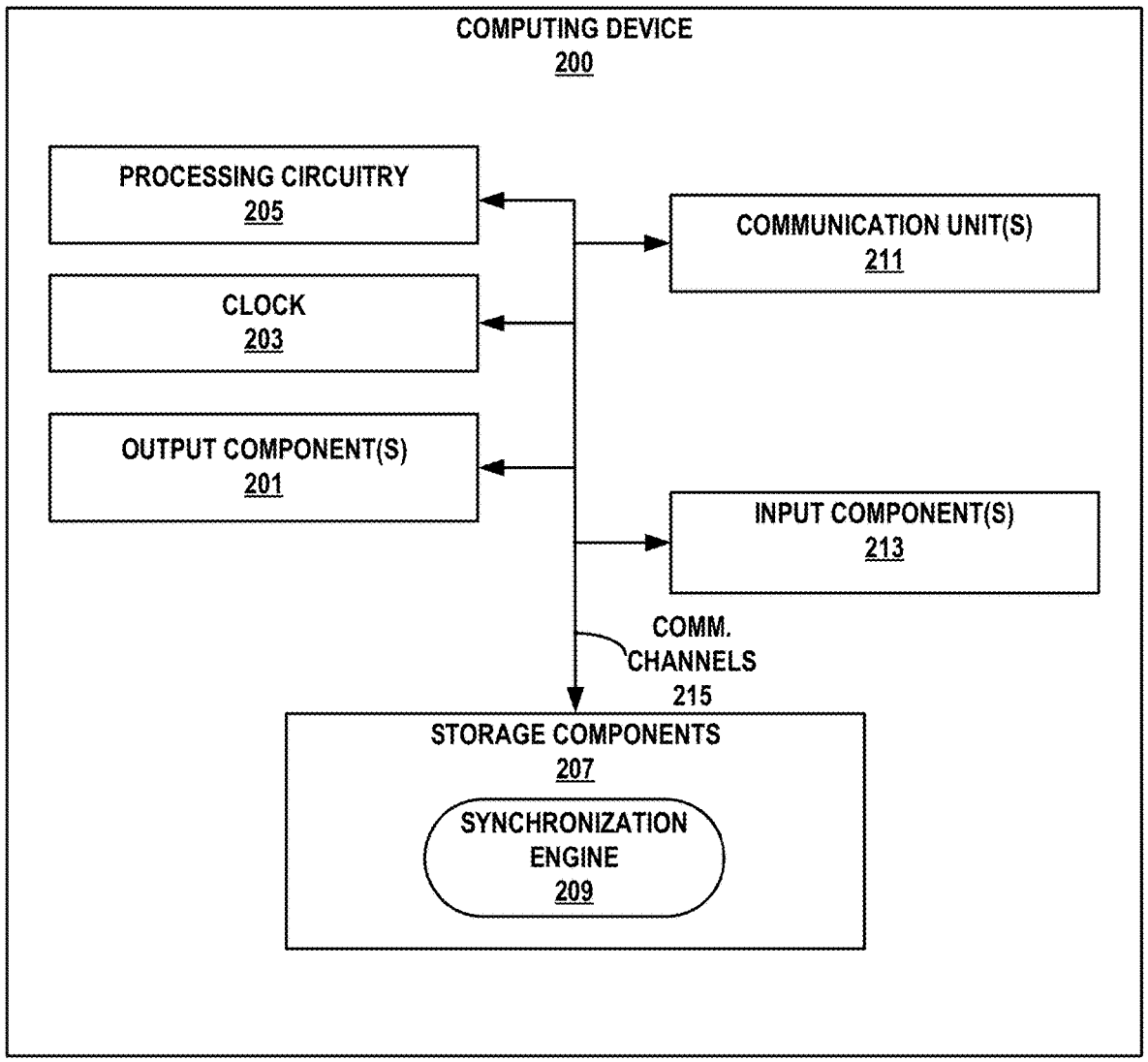
FIG. 2 is a block diagram illustrating an example computing device within one of the co-location data centers of FIG. 1 in accordance with one or more techniques of the disclosure.

FIG. 2 is a block diagram illustrating example computing device 200 within one of co-location data centers 100 of FIG. 1 in accordance with one or more techniques of the disclosure. Computing device 200 of FIG. 2 is described below as an example of one of computing devices 102 of FIG. 1. FIG. 2 illustrates only one example of computing device 200, and many other examples of computing device 200 may be used in other instances and may include a subset of the components included in example computing device 200 or may include additional components not shown in example computing device 200 of FIG. 2.

As shown in the example of FIG. 2, computing device 200 includes processing circuitry 205, one or more input components 213, one or more communication units 211, one or more output components 201, and one or more storage components 207. Storage components 207 of computing device 200 include emulation module 4 and modulation module 6. Communication channels 215 may interconnect each of the components 201, 203, 205, 207, 211, and 213 for inter-component communications (physically, communicatively, and/or operatively). In some examples, communication channels 215 may include a system bus, a network connection, an inter-process communication data structure, or any other method for communicating data.

One or more communication units 211 of computing device 200 may communicate with external devices, such another of computing devices 102 of FIG. 1, via one or more wired and/or wireless networks by transmitting and/or receiving network signals on the one or more networks. Examples of communication units 211 include a network interface card (e.g. such as an Ethernet card), an optical transceiver, a radio frequency transceiver, a GPS receiver, or any other type of device that can send and/or receive information. Other examples of communication units 211 may include short wave radios, cellular data radios, wireless network radios, as well as universal serial bus (USB) controllers.

One or more input components 213 of computing device 200 may receive input. Examples of input are tactile, audio, and video input. Input components 213 of computing device 200, in one example, includes a presence-sensitive input device (e.g., a touch sensitive screen, a PSD), mouse, keyboard, voice responsive system, video camera, microphone or any other type of device for detecting input from a human or machine. In some examples, input components 213 may include one or more sensor components one or more location sensors (GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., microphone, camera, infrared proximity sensor, hygrometer, and the like).

One or more output components 201 of computing device 200 may generate output. Examples of output are tactile, audio, and video output. Output components 201 of computing device 200, in one example, includes a PSD, sound card, video graphics adapter card, speaker, cathode ray tube (CRT) monitor, liquid crystal display (LCD), or any other type of device for generating output to a human or machine.

Processing circuitry 205 may implement functionality and/or execute instructions associated with computing device 200. Examples of processing circuitry 205 include application processors, display controllers, auxiliary processors, one or more sensor hubs, and any other hardware configure to function as a processor, a processing unit, or a processing device. Synchronization engine 209 may be operable by processing circuitry 205 to perform various actions, operations, or functions of computing device 200. For example, processing circuitry 205 of computing device 200 may retrieve and execute instructions stored by storage components 207 that cause processing circuitry 205 to perform the operations of Synchronization engine 209. The instructions, when executed by processing circuitry 205, may cause computing device 200 to store information within storage components 207.

One or more storage components 207 within computing device 200 may store information for processing during operation of computing device 200 (e.g., computing device 200 may store data accessed by Synchronization engine 209 during execution at computing device 200). In some examples, storage component 48 is a temporary memory, meaning that a primary purpose of storage component 48 is not long-term storage. Storage components 207 on computing device 200 may be configured for short-term storage of information as volatile memory and therefore not retain stored contents if powered off. Examples of volatile memories include random-access memories (RAM), dynamic random-access memories (DRAM), static random-access memories (SRAM), and other forms of volatile memories known in the art.

Storage components 207, in some examples, also include one or more computer-readable storage media. Storage components 207 in some examples include one or more non-transitory computer-readable storage mediums. Storage components 207 may be configured to store larger amounts of information than typically stored by volatile memory. Storage components 207 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 207 may store program instructions and/or information (e.g., data) associated with Synchronization engine 209. Storage components 207 may include a memory configured to store data or other information associated with synchronization engine 209.

Clock 203 is a device that allows computing device 200 to measure the passage of time (e.g., track system time). Clock 203 typically operates at a set frequency and measures a number of ticks that have transpired since some arbitrary starting date. Clock 203 may be implemented in hardware or software.

In accordance with the techniques of the disclosure, synchronization engine 209 performs time synchronization for a plurality of computing devices 102, 108 of FIG. 1 that exhibit asymmetric delay along paths between the plurality of computing devices 102, 108. In one example, synchronization engine 209 receives a graph, wherein nodes of the graph represent one or more clocks of one or more computing devices 102, 108 and vertices of the graph represent one or more bidirectional paths between the clocks. Each bidirectional path exhibits an asymmetric delay, e.g., the bidirectional path exhibits a first path delay in a first direction between the two clocks that is different from a second path delay in a second direction between the two clocks. Synchronization engine 209 determines one or more closed loops in the graph and a delay for each of the one or more closed loops. As described in more detail below, synchronization engine 209 applies a minimization function to the delay of each of the one or more closed loops to determine values for the delay in each direction of each bidirectional path between the clocks. Based on the values for the delay in each direction of each bidirectional path, synchronization engine 209 applies a time correction to at least one clock of the plurality of clocks of computing devices 102, 108.

Each closed loop describes a traversal of the graph that includes at least a unidirectional path from a first clock to a second clock and a unidirectional path from the second clock to the first clock. In some examples, a closed loop includes paths between at least three clocks. In some examples, a closed loop includes paths between at least three clocks. In some examples, a closed loop traverses a plurality of clocks in a clockwise path on the graph. In some examples, a closed loop traverses a plurality of clocks in a counterclockwise path on the graph.

In some examples, synchronization engine 209 applies a normalizing function to the one or more closed loops to generate one or more normalized loops. For example, for each closed loop, synchronization engine 209 determines a plurality of paths that make up the closed loop. Synchronization engine 209 further determines a ratio of a delay of each of the paths to a total delay of the closed loop such that the sum of the path ratios is, e.g., 1. Thus, by normalizing the closed loop, processing circuitry may simplify the application of the minimization function to the delays of the one or more closed loops.

In some examples, synchronization engine 209 applies the minimization function by applying a machine learning system to the delay of each of the one or more closed loops to determine values for the first path delay and the second path delay of each bidirectional path. The machine learning system may be trained with a plurality of graphs labeled with a plurality of path asymmetries. In another example, synchronization engine 209 applies the minimization function by applying a gradient descent algorithm to the delay of each of the one or more closed loops to determine values for the first path delay and the second path delay of each bidirectional path.

In some examples, clock 203 is a reference clock, and clocks of other computing devices 102, 108 are slave clocks. Synchronization engine 209 applies, based on the values for the delay in each direction of each bidirectional path on the graph, a time correction to each of the slave clocks of other computing devices 102, 108 to synchronize the slave clocks of other computing devices 102, 108 with clock 203.

Figure 3:
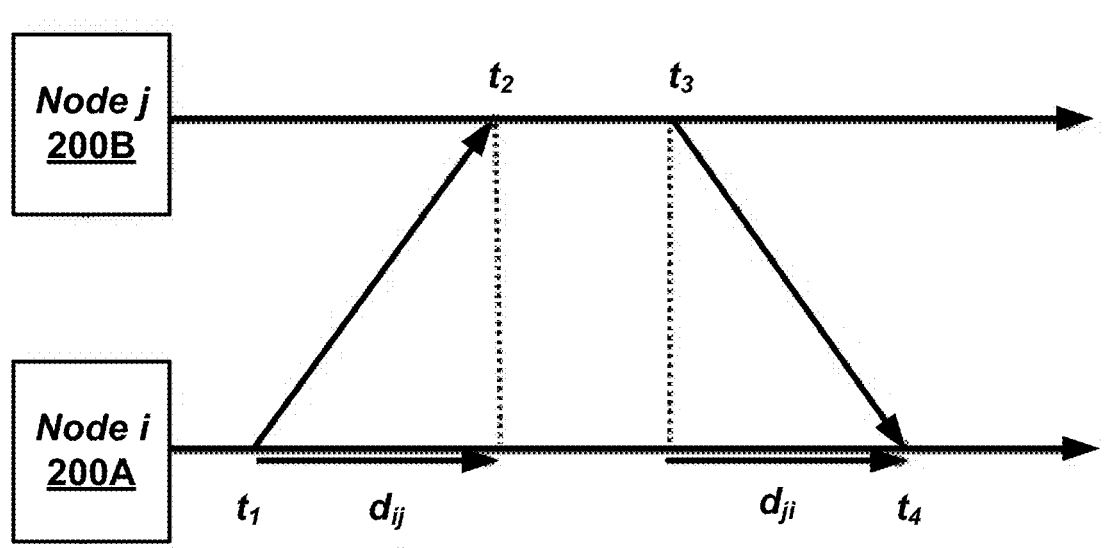
FIG. 3 is a block diagram illustrating an example clock synchronization operation between two computing devices of FIG. 1.

FIG. 3 is a block diagram illustrating an example clock synchronization operation between two computing devices 200A-200B (hereinafter, computing devices 200). Computing devices 200 may be examples of computing device 200 of FIG. 2. In the example of FIG. 3, computing device 200A and 200B are connected via a bidirectional path (e.g., a path that allows signals to be sent in either direction along the path). Computing device 200A transmits a first timing signal at timestamp $t_1$ which is received by computing device 200B at timestamp $t_2$. Computing device 200B transmits a second timing signal at timestamp $t_3$ which is received by computing device 200A at timestamp $t_4$.

As discussed above, if a first path delay (path length) $d_{ij}$ is assumed to be symmetric with a second path delay $d_{ji}$, clock synchronization performed between computing device 200A and computing device 200B may be inaccurate where an asymmetry exists. Furthermore, where such asymmetry is dynamic, further inaccuracy may be generated where the asymmetry effect changes in real time.

There are various sources of asymmetry, such as variable queuing/buffering delays, processing delays, route asymmetry, variations in link bandwidth, differences in physical cable lengths, and so forth. Of these types of delays, only static asymmetry due to a physical fiber length may be manually measured and incorporated into a conventional synchronization algorithm. Because the cable length between two computing devices 200 may change over time, conventional techniques still require this static delay to be periodically recalibrated.

In contrast, delay due to dynamic effects may be impossible for conventional synchronization algorithms to correct. For example, a queueing effect along a path that occurs due to network traffic may induce dynamic variation in delay. Further, network traffic in-bound to computing device 200A and out-bound from computing device 200A may be different. Therefore, the different delay in this in-bound and out-bound traffic due to queueing may induce extra asymmetry in the path between computing devices 200. Conventional techniques may be unable to model such a dynamic queueing effect. Furthermore, conventional techniques may be unable to measure such dynamic asymmetry.

It may be helpful to dynamically measure path asymmetry between computing devices in real time. Such large asymmetry that may exist becomes a bottleneck for precision timing applications. The techniques disclosed herein may dynamically measure path asymmetry without requiring manual calibration or modeling the queueing effect offline, which may be cumbersome, inaccurate, or unable to account for dynamic changes in the path delay. Accordingly, the techniques disclosed herein provide for a system that may directly and accurately learn both the static and dynamic asymmetry in paths between computing devices in real time. Further, the techniques disclosed herein may be used to correct the clock time of multiple computing devices in a manner that is much more accurate than manual clock synchronization techniques.

Path asymmetry is important for two stage time synchronization algorithms, such as NTP or PTP. As depicted in FIG. 3, a two-way synchronization schemes between the two clock nodes i (e.g., computing device 200A) and j (e.g., computing device 200B) is performed. The path from node i to node j ($d_{ij}$, or the time spent for a packet to go from node i to node j) generally is different from the path from node j to node i ($d_{ji}$, or the total time spent for a packet to go from node j to node i). The path ratio is defined as:

$$w_{ij} = \frac{d_{ij}}{d_{ij}+d_{ji}}, w_{ji} = \frac{d_{ji}}{d_{ij}+d_{ji}}$$

This relationship means a graph of the clock system i,j is bidirectional with the relationship $w_{ij}+w_{ji}=1$.

As illustrated in FIG. 3, $t_1$ and $t_2$ are defined as the transmit and receive timestamps from node i to node j, respectively. Additionally, $t_3$ and $t_4$ are defined as the reverse direction as shown in FIG. 3. An offset between the two clocks i,j and the path length between the two clocks i,j can be calculated as follows.

Node i and j are defined according to the following clock model:

$$t_{c,1}(T)=f_1(T+T_0)+\theta_{10}$$

$$t_{c,2}(T)=f_2(T+T_0)+\theta_{20}$$

where f is clock frequency and $\theta_0$ is clock offset at time $T_0$. T is true time-elapsed since $T_0$. For simplicity, $T_0$ is assumed to be the time when node i sends a message at $t_1$. This results in the following set of relationships:

$$t_1=t_{c,1}(T=0)=f_1T_0+\theta_{10}$$

$$t_2=t_{c,2}(T=d_{ij})=f_2(T_0+d_{ij})+\theta_{20}$$

$$t_3=t_{c,2}(T=d_{ij}+\Delta)=f_2(T_0+d_{ij}+\Delta)+\theta_{20}$$

$$t_4=t_{c,1}(T=d_{ij}+\Delta+d_{ji})=f_1(T_0+d_{ij}+\Delta)+\theta_{10}$$

From the above, if the difference between $f_1$ and $f_2$ is ignored such that $f_1=f_2=1$:

$$t_2-t_1=d_{ij}+\theta_{20}-\theta_{10}$$

$$t_4-t_3=d_{ji}+\theta_{10}-\theta_{20}$$

By applying the definition of $$w_{ij}=\frac{d_{ij}}{d_{ij}+d_{ji}}$$

to the above, $\sigma_{ij}$ may be defined as:

$$\sigma_{ij}=\theta_{20}-\theta_{10}=(1-w_{ij})(t_2-t_1)-w_{ij}(t_4-t_3)$$

such that the following relationships may be defined:

$$\sigma_{ij} = (1-w_{ij})(t_2-t_1) - w_{ij}(t_4-t_3)$$

$$d_{ij} = w_{ij}[(t_2-t_1) + (t_4-t_3)]$$

$$d_{ji} = w_{ji}[(t_2-t_1) + (t_4-t_3)]$$

Note that the above equation may become inaccurate when there is a large difference in frequency and long propagation time. One may calculate the offset in the general case by including the frequency difference. The discussion of an example simulation of the techniques of the disclosure that takes place subsequently does not include the effect of frequency. The offset is defined as the difference in the clock time:

$$\sigma_{ij} = t_{c,j} - t_{c,i}$$

Conventional synchronization algorithms assume a symmetric path w=0.5 and the offset of the two clocks is given by:

$$\sigma_{sym} = 0.5(t_2-t_1) - 0.5(t_4-t_3)$$

This assumption gives an error of the clock offset:

$$\sigma_{sym} - \sigma_{ij} = (w_{ij} - 0.5)(t_2 - t_1 - t_4 + t_3)$$

Thus, conventional synchronization algorithms suffer from an error that is proportional the asymmetry. Thus, the asymmetry may limit the performance of conventional synchronization algorithms when the asymmetry is large.

Figure 4A:
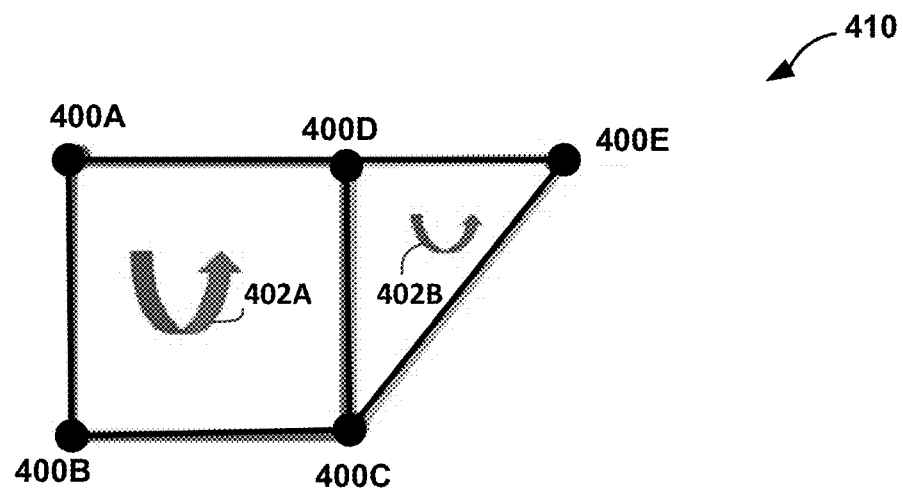
FIGS. 4A and 4B are block diagrams of example graphs of clocks in accordance with the techniques of the disclosure.
Figure 4B:
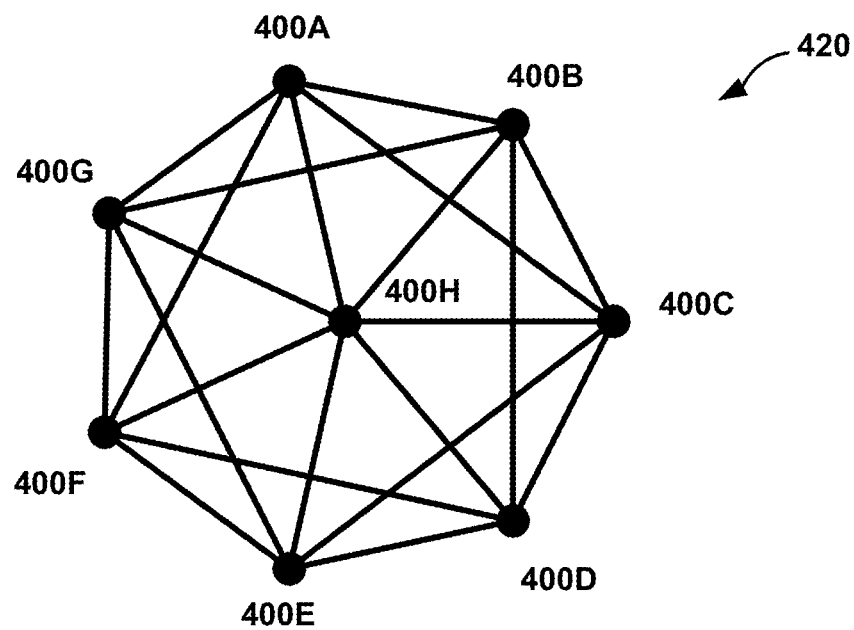

FIGS. 4A and 4B are block diagrams of example graphs of clocks in accordance with the techniques of the disclosure. FIG. 4A is a block diagram of an example graph 410 of clocks 400A-400E (hereinafter, "clocks 400") in accordance with the techniques of the disclosure. As illustrated in FIG. 4A, clocks 400 are located at the vertices of graph 410. There is a total of five clocks 400 and two loops 402A, 402B as shown by blue (402A) and green (402B) color. Each of clocks 400 may be an example of clock 203 of a different computing device 200 of FIG. 2. In the example of FIG. 4A, loops 402A, 402B are counterclockwise.

For example, loop 402A begins, e.g., with clock 400A, traverses a path between clock 400A and clock 400B, traverses a path between clock 400B and 400C, traverses a path between clock 400C and 400D, and returns to clock 400A via a path between clock 400D and 400A. As another example, loop 402B begins, e.g., with clock 400C, traverses a path between clock 400C and clock 400E, traverses a path between clock 400E and 400D, and returns to clock 400C via a path between clock 400D and 400C. In other examples, loops of other graphs may be counterclockwise or clockwise.

Asymmetric delay on a bidirectional path between two computing devices 400 may be either static or dynamic. For instance, differences in fiber length or port and switch speed mismatch may cause static differences in delay, while queueing and the stochastic effect may cause dynamic differences in delay. Without loss of generality, a bidirectional path is assumed to dynamically vary with time, therefore the path ratio generally is also a function of time. The techniques assume a small time-interval to learn the overall asymmetry in the path, including both static and dynamic asymmetry. In some examples, the techniques of the disclosure may use time stamping data that is similar to time stamping data used by NTP or PTP to learn the path asymmetry. Further, the techniques of the disclosure do not require any additional data to be sent between computing devices in a time stamping operation.

In accordance with the techniques of the disclosure, computing device 200 receives graph 410 of the layout of clocks 400 on the network. Graph 410 describes connections between each of clocks 400 on the network, wherein each node of graph 410 represents a clock 400 and each vertex of graph 410 represents a bidirectional path between two clocks 400. Computing device 200 determines one or more closed loops 402 between clocks 400.

When the path ratio w=0.5 for all edges, the graph is symmetrical. For simplification, the subscript the path ratio w is dropped herein. For each loop in graph 410, the following statement should be true:

$$\sum_{i,j}^{loop\,k} \sigma_{ij}^k = 0,$$

k for all loops.

The edges have direction, e.g., computing device 200 treats the edges of loops 402 in a counterclockwise fashion. Thus, computing device 200 may minimize perform the following loss function to compute the delay in each loop 402:

$$\text{loss}_t(W(t)) = \frac{1}{N} \sum_{loop=1}^{N} \left( \sum_{edges \subset loop} \sigma_{edges} \right)^2$$

where N is the number of loops in graph 410. The number of edges in each of loops 402 may be different from the number of edges in each other loop 402, as depicted in FIG. 4A. Further, the edges of each loop 402 have direction, e.g., $\sigma_{ij} \neq \sigma_{ji}$.

Depending on the mechanism of path variation, the dynamic path delay may change rapidly (e.g., due to network traffic congestion) or slowly (e.g., due to temperature). Static path delay, sch as the physical length of the fiber, may be treated as approximately constant for a long period of time. Here, the techniques of the disclosure assume a short time window to learn the overall asymmetry, including dynamic and static asymmetry. For example, the techniques may use a time interval used by timing synchronization techniques such as NTP or PTP.

At each time interval, the asymmetry can be learned by minimizing the following loss function:

$$\text{loss}_H(W) = \text{loss}_t + \lambda(W-0.5)^2,$$

where λ is a positive number. The second term is regularization. This term is used to avoid large asymmetry solutions. Computing device 200 may perform the minimization function using various numerical approaches. In one example, the minimization function is a gradient descent algorithm. In another example, the minimization function is a machine learning system or neural network. An example machine learning system capable of performing the minimization function described above is TensorFlow, available from www.tensorflow.org.

FIG. 4B is a block diagram of another example graph 420 of clocks 400A-400H (hereinafter, "clocks 400") in accordance with the techniques of the disclosure. In the example of FIG. 4B, each clock 400 connects to its two neighbor clocks 400 on both ends (4 total neighbor connections per clock 400). Central clock 400H is the master clock. Graph 420 includes 21 total edges (e.g., connections between clocks 400). Computing device 200 of FIG. 2 may determine one or more closed loops in graph 420. For example, computing device 200 may determine a first loop 400H-400B-400A-400H, a second loop 400H-400G-400F-400H, and a third loop 400H-400C-400D-400E-400H. Computing device 200 may determine additional loops in graph 420 not expressly described herein. Thus, it may be seen that a loop may include paths between at least three clocks 400. The full paths of the connections may vary to represent a general case. The goal is to learn the path asymmetry for different edges between different computing devices 400.

Because the performance of the algorithm depends on the distribution of the asymmetry, computing device 200 may apply a machine learning system to test different distributions of asymmetry to arrive at a best-fit solution for the minimization function. For example, computing device 200 assumes that the path asymmetry has a normal distribution along the edges/connections defined as:

$$w = N(0.5, \sigma_W).$$

The normal distribution has a mode (e.g., a center) at 0.5 and standard deviation of $\sigma_W = 0.1$. An example implementation of the techniques of the disclosure is evaluated for 100,000 tests. The standard deviation of the error in w is about half of $\sigma_W$ for a regularization factor A between 0.1 and 1.0.

Figure 5A:
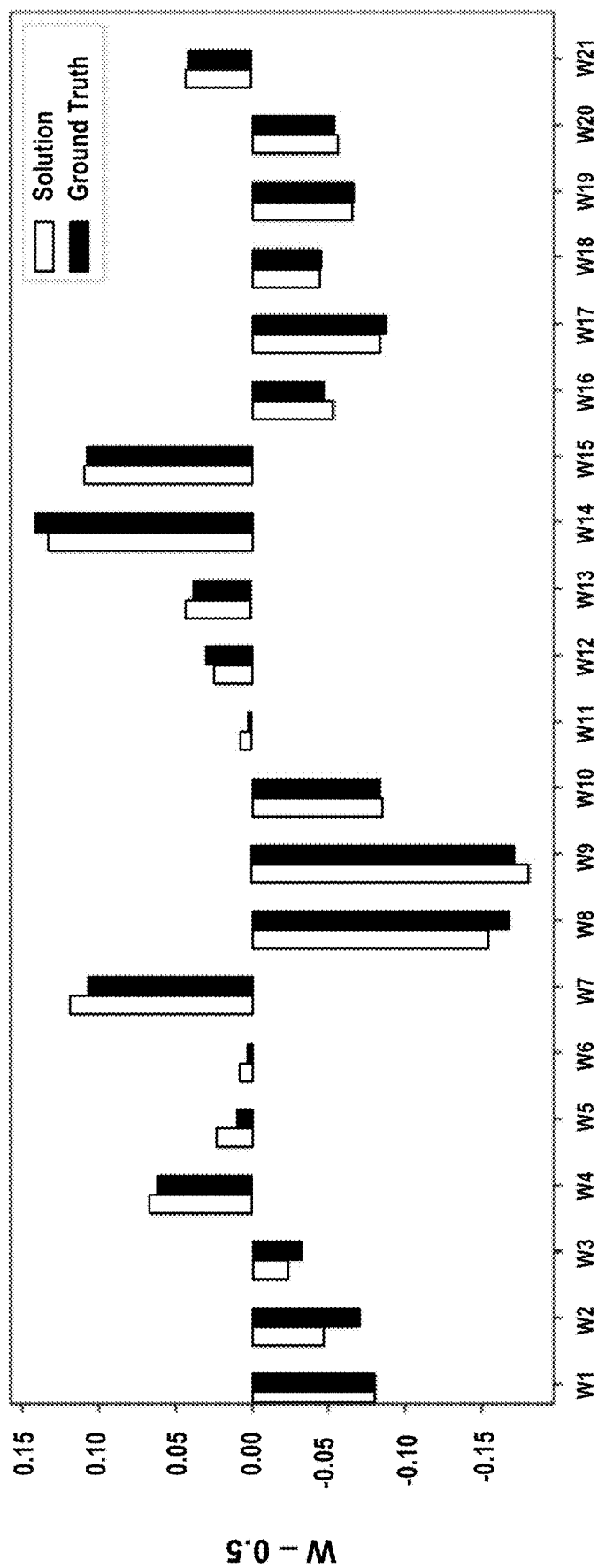
FIGS. 5A-5B are charts illustrating examples of learned path asymmetry for the example clock graph of FIG. 4B.
Figure 5B:
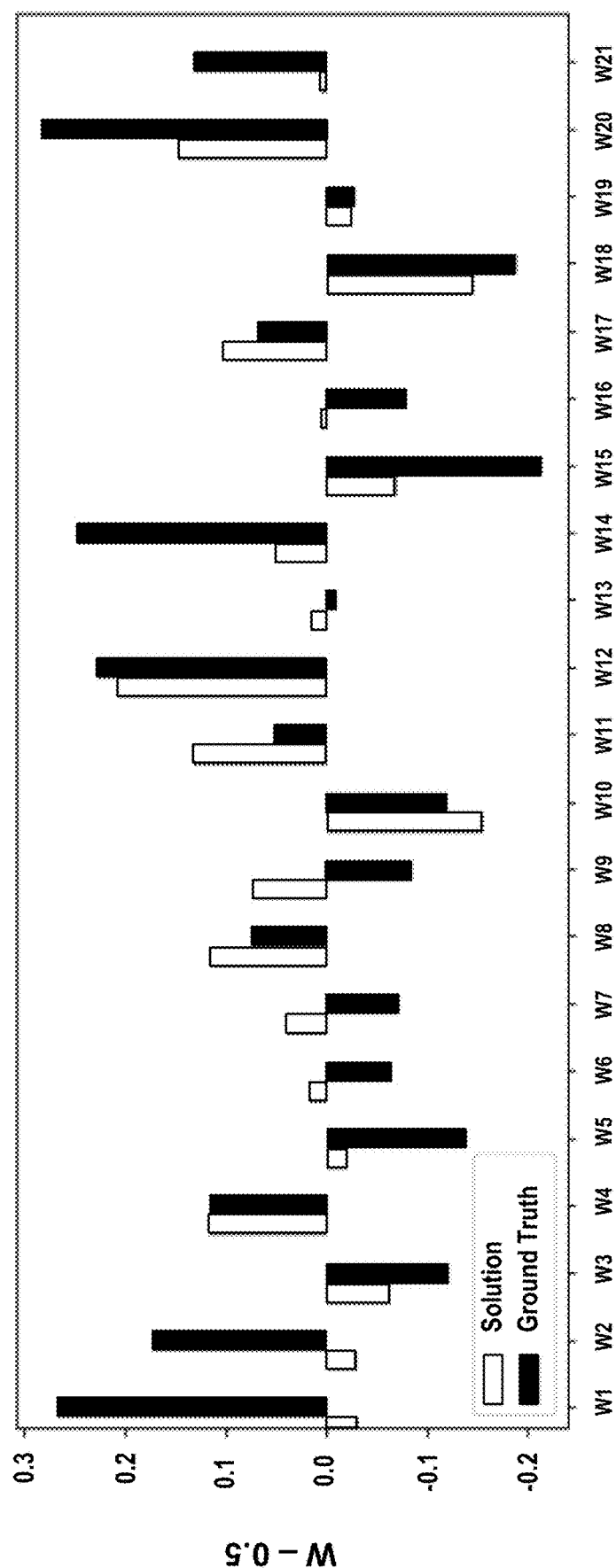

FIGS. 5A-5B are charts illustrating examples of learned path asymmetry for example clock graph 420 of FIG. 4B. FIG. 5A is a chart illustrating an example of a good solution for the learned path asymmetry of graph 420. FIG. 5B is a chart illustrating an example of a poor solution for the learned path asymmetry that is far away from the true value of the path asymmetries of graph 420. For ease of illustration, the vertical axis of FIGS. 5A and 5B depict w−0.5 instead of w.

The random uniform distribution of the path asymmetry along the connections/edges of graph 420 is further evaluated:

$$w = U(0.5 - \sigma_w, 0.5 + \sigma_w)$$

The distribution has a mode (e.g., center) at 0.5 and a full width at half-maximum of $\sigma_w = 0.05$. Again, the error is close to half of the true standard deviation. The regularization factor λ has a similar error. The range of λ which gives good solutions fills into (0,19 (e.g., the set excludes zero and includes 1).

FIG. 6 is a table 600 illustrating performance measurements for an example implementation of the techniques of the disclosure. Specifically, table 600 summarizes the performance for graph 420 of FIG. 4B. Generally, techniques of the disclosure reduce the offset error due to path asymmetry by a factor of about 2. Note that each clock 400 in graph 420 connects to two neighbors on each side (e.g., for a total of 4 connections to neighbors). The learning errors roughly follows the scaling law, with the number of connections N defined as:

$$\sigma_w^{error} \propto \frac{\sigma_w^{True}}{N^\gamma},$$

where γ is a number between ½ and 1. The greater the number of connections, the greater the accuracy of learned path asymmetries. However, a graph with a large number of connections between clocks may have a negative impact on network traffic due to the large number of timing signals that are exchanged. Further, the performance of learning is may be limited. For example, the error is proportional to the true value; when path asymmetry increases, the error also increases. Therefore, the above approach may reduce the amount of delay due to asymmetry, but does not completely solve the real problem, especially for large path asymmetries. More importantly, the performance of the asymmetry learning algorithm is sensitive to the asymmetry adhering to a normal distribution.

Mathematically, the problem of path asymmetry is undetermined (the main matrix has a singularity) because there are multiple global minima for minimization function $loss_{II}(W) = loss_I + \lambda(W-0.5)^2$ described above. This may be more easily understood by an example. Note that the constraints in the equation $$\sum_{i,j}^{loop} \sigma_{ij}^j = 0,$$

k are over each loop, as opposed to each edge. Regularization provides a unique solution. For example, in a single loop graph comprising three edges, one edge induces a +1 μs offset due to the asymmetry, the second edge induces a −1 μs offset, and the third one is symmetric. Thus, the total error in offset over the foregoing example loop is 0. Due to regularization, the minimization function described herein provides the solution that there is zero asymmetry in all edges. This may be overcome by including more connections from each clock 400 in that extra information provides a better chance to learn the true values for asymmetry in the system.

The techniques of the disclosure contemplate further improvements to the above approach for path asymmetry learning (referred to herein as the "learning algorithm"). For example the learning algorithm demonstrates improved performance where there are a large number of connections between clocks 400 (e.g., due to more information that may be used to inform the determination of path asymmetry). Further, the learning algorithm is sensitive to the distribution of the asymmetry. The techniques of the disclosure further provide an algorithm for learning the ground truth (e.g., values for the path asymmetry) without such limitations (hereinafter referred to as the "enhanced learning algorithm).

The techniques of the disclosure recognize the error in offset due to the asymmetry demonstrates a strong correlation with the gradient $G = (t_2 - t_1 - t_4 + t_3)$. The techniques of the disclosure may apply a gradient descent algorithm to the loss minimization function to enhance the learning of path asymmetry (e.g., the enhanced learning algorithm):

$$loss_{III}(W) = loss_I + \lambda_1(W-0.5)^2 + \lambda_2 Corr(W-0.5, -\tilde{G}),$$

where $\lambda_2$ is new regularization factor, which is non-negative number. The last term is the correlation between the two vectors in the bracket:

$$Corr(X, Y) = \frac{XY}{\|X\|\|Y\|},$$

where $\tilde{G}$ is the normalized gradient, which is defined as:

$$\tilde{G} = \frac{G}{t_2 - t_1 + t_4 - t_3}$$

Note that a negative sign before $\tilde{G}$ is added in the foregoing equation for loss minimization function. Thus, the maximization problem for path asymmetry may be converted to a minimization problem. The minimization function presented above minimizes the loss, therefore the minimization function converges with a solution that has a large correlation with $\tilde{G}$. Now there are two regularizations. The first adds a penalty for solutions with large asymmetry, while the second allows the minimization function to find solution where the asymmetry is correlated with the gradient.

Figure 7A:
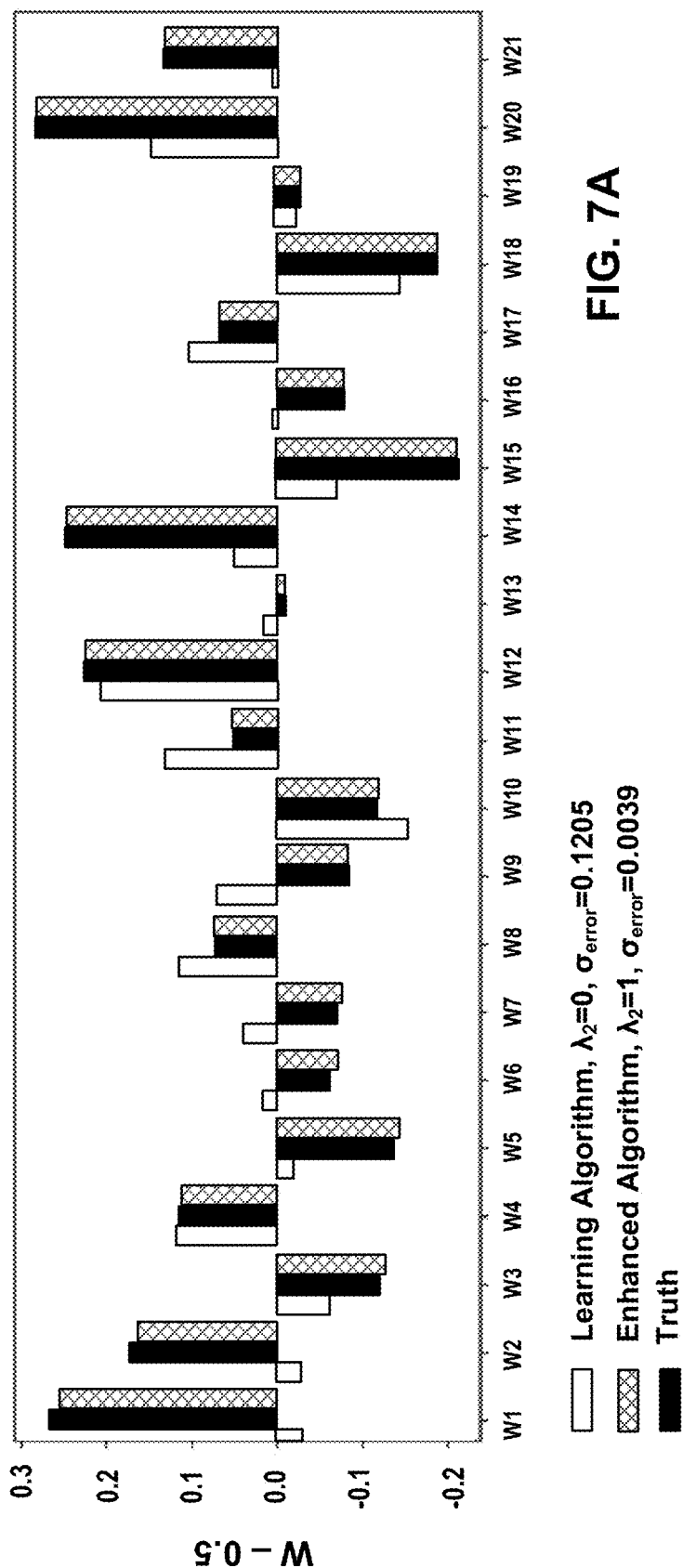
FIGS. 7A-7C are charts illustrating comparisons of different minimization functions for path asymmetry in accordance with the techniques of the disclosure.
Figure 7B:
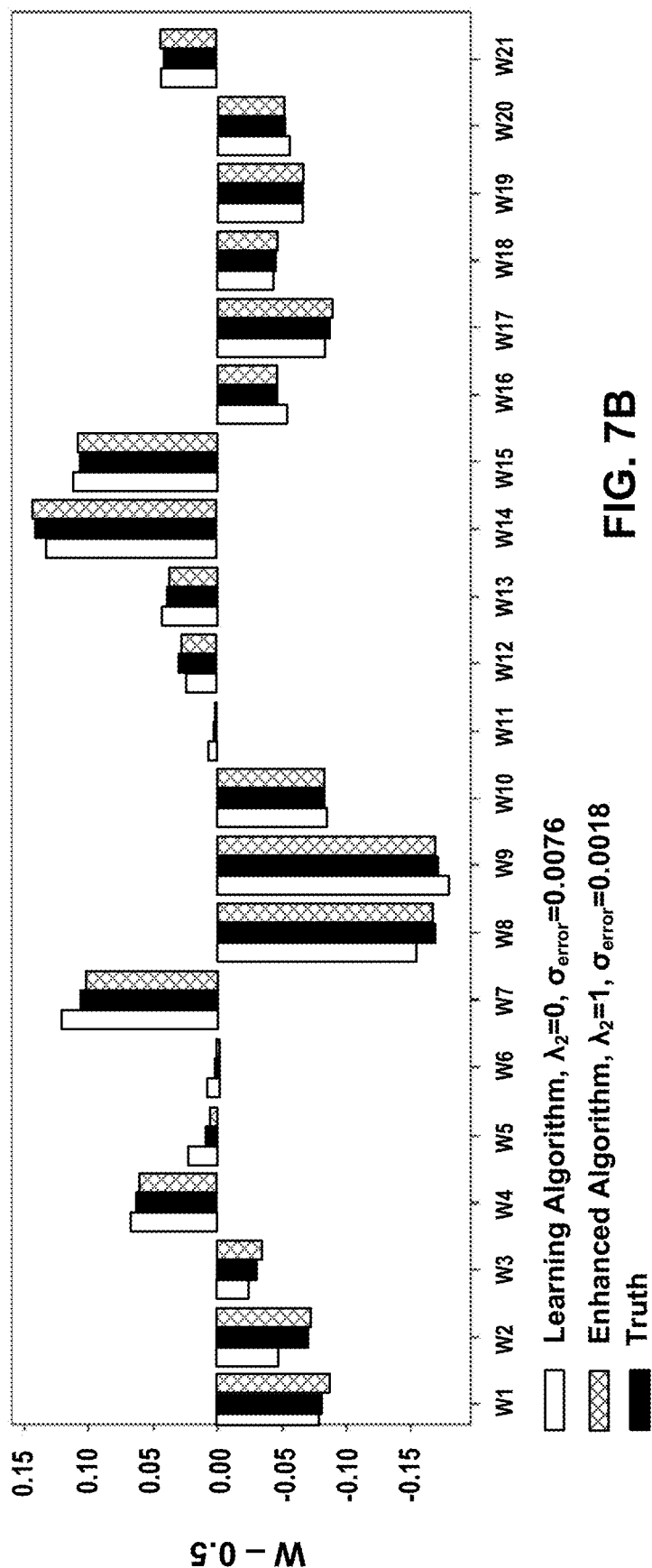
Figure 7C:
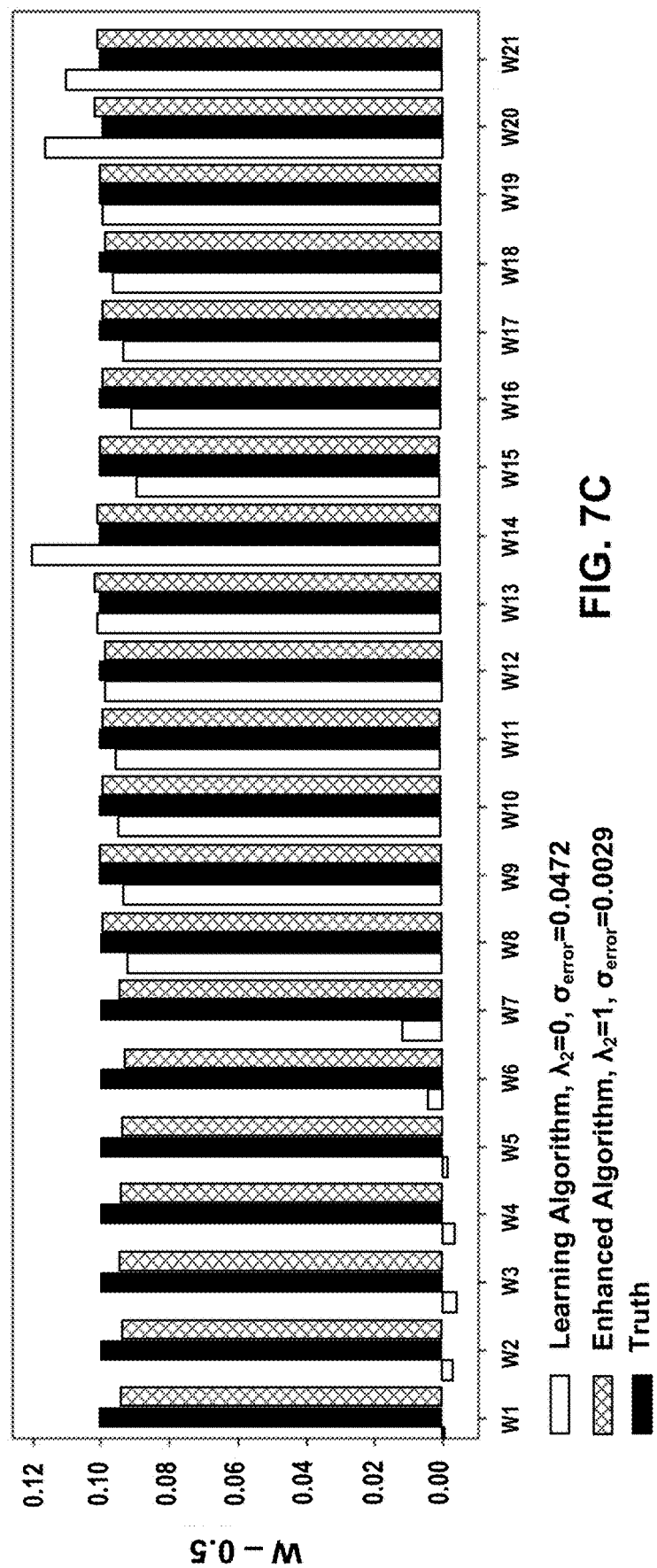

FIGS. 7A-7C are charts illustrating comparisons of different minimization functions for path asymmetry in accordance with the techniques of the disclosure. Specifically, FIGS. 7A-7C illustrate a comparison between the learning algorithm and the enhanced learning algorithm. As illustrated in FIGS. 7A-7C, the techniques of the disclosure learn the path asymmetric well for all cases. The asymmetry has a normal distribution with a standard deviation of 0.1 in the top two plots. The relative accuracy of the learning algorithms may be learned by comparing the learned path asymmetry with the errors shown in the plot labels of FIGS. 7A-7C.

Specifically, FIGS. 7A-7C depict a comparison between the performance of the learning algorithm and the enhanced learning algorithm for three different cases: the worst case for the learning algorithm, the best case for the learning algorithm, and a uniform asymmetry case. The enhanced learning algorithm may learn the asymmetry in a more accurate fashion as compared to the learning algorithm. Its performance is independent from the distribution of the asymmetry, the number of connections between clocks, or the amplitude of asymmetry. In another words, the enhanced learning algorithm completely eliminates the limitation of error, defined above as $$\sigma_w^{error} \propto \frac{\sigma_w^{True}}{N\gamma},$$

that constrains the learning algorithm. The enhanced learning algorithm learns the asymmetry with much higher accuracy. Note that the hyperparameters $\lambda_1$ and $\lambda_2$ may be optimized in practice. A small $\lambda_1$ may be used to ensure that the second regularization dominates the optimization.

Figure 8:
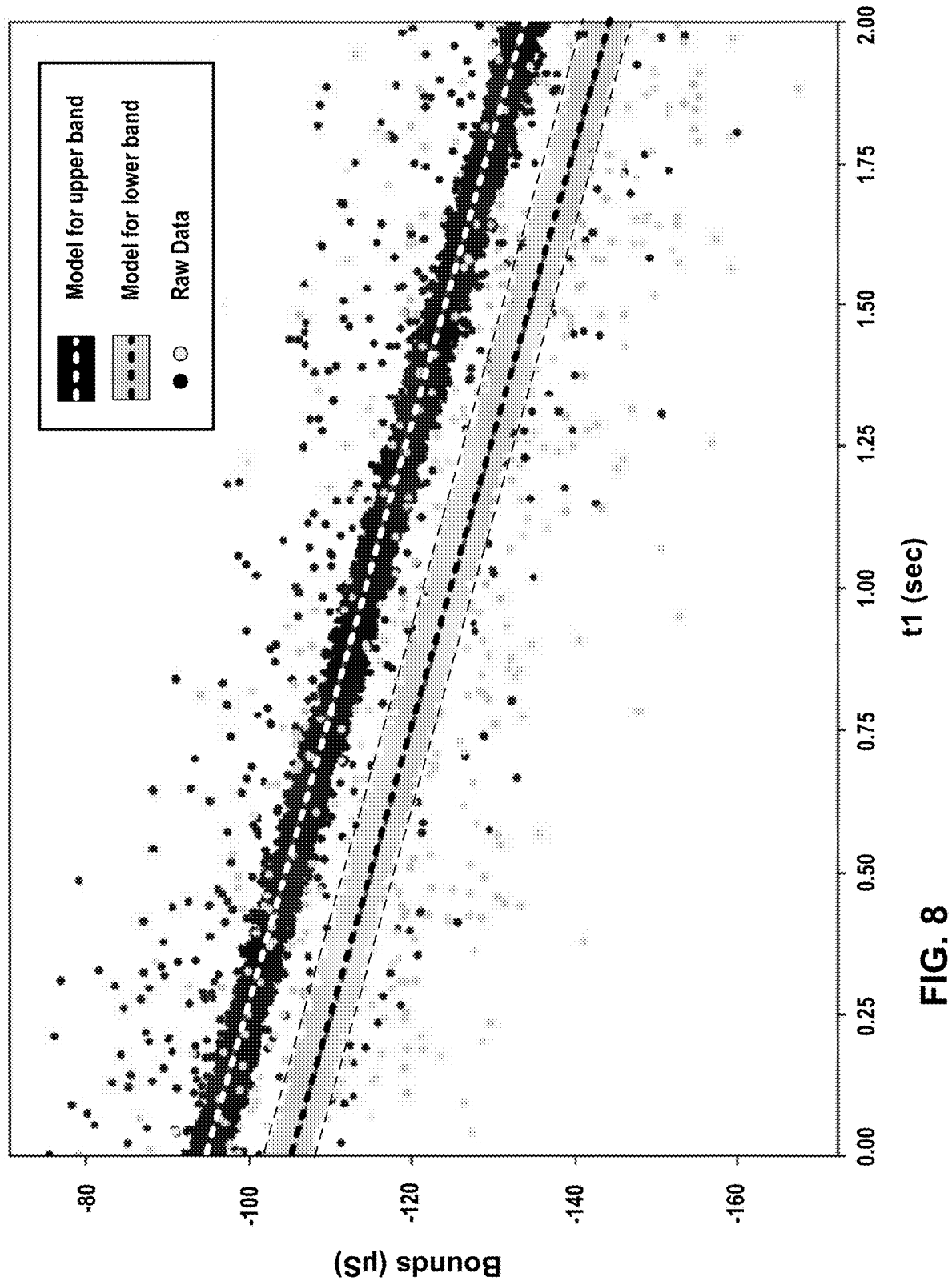
FIG. 8 is a graph illustrating example bounds of timestamp data having large noise.

FIG. 8 is a graph illustrating example bounds of timestamp data having large noise. With reference to FIG. 3, the timestamp data ($t_1$, $t_2$, $t_3$, and $t_4$) may have large jitter during measurement. FIG. 8 depicts such large jitter over a 2-second time interval. Such noisy data may not be directly used to learn path asymmetry. Instead, an accurate model (shown by dashed lines) is first learned to remove the impact of noise/jitter on the learning algorithm. Computing device 200 may apply numerous types of data processing approaches to generate such an accurate model. For example, computing device 200 may apply packet selection, low-bandwidth filtering and/or other advanced techniques to remove noise and generate the accurate model for use in earning the path asymmetry. The time synchronization algorithm learns the clock frequency shift (dashed lines) in a similar fashion. Therefore no extra computation is needed for the path asymmetry algorithm described herein to learn path asymmetry from the noisy data. Thus, for the techniques of the disclosure to be used to learn path asymmetry independently, it is straightforward to learn from noisy data as depicted in FIG. 8.

Further, the techniques of the disclosure may be applied to differentiate static asymmetry from dynamic asymmetry. Using the techniques described above, computing device 200 may learn the total path asymmetry regardless of the sources. Further, computing device 200 may distinguish static asymmetry from dynamic asymmetry. Static asymmetry refers to asymmetry that does not change over an intermediate time period (e.g., days or weeks). From the historical asymmetry results learned by the asymmetry learning algorithm, stable asymmetry over days or weeks is treated as static asymmetry.

The techniques of the disclosure may further learn path asymmetry even for large values of asymmetry. For example, for connections between clocks in a research or educational setting (e.g., such as a campus network), path asymmetry may be approximately w=0.5. However, in a commercial network, there may be significant asymmetry on the order of w=0.4 or w=0.6. In the case of large asymmetry, there may be a large signal-to-noise ratio (SNR). Noise as described herein refers to measurement error, jitter, etc. Large asymmetry was tested in simulation. The techniques of the disclosure function equally well for paths that exhibit large or small asymmetry.

The techniques of the disclosure may be applied in the presence of other types of error in delay. In reality, there are frequently errors in measurement and calculation. Generally, error may not be easy to handle except where the nature of the source of error is known. The techniques of the disclosure may learn such types of error from historical data. For example, computing device 200 may monitor the distribution of asymmetry over a long period of time and apply statistics to model the asymmetry so as to minimize the impact of such errors. The techniques of the disclosure may be extended to error learning.

Thus, performance of the techniques described herein for precision timing synchronization is not limited in accuracy due to large path asymmetry. For example, the techniques may avoid error in clock offset that is proportional or equal to the asymmetry for such large path asymmetry. Rather than measuring static asymmetry or simulating the queueing effect, a computing device in accordance with the techniques of the disclosure may directly learn the overall asymmetry from timestamps in two-way time synchronization communication. Two types of learning algorithms are described herein. The first, the learning algorithm described above, uses regularization to learn path asymmetry. Because the learning algorithm is an undetermined problem, its performance is limited to a standard deviation of error to the ground truth (e.g., actual asymmetry). In order to further improve the performance of the learning algorithm, each clock may connect to additional clocks at the cost of increased network traffic.

To overcome the issues with the learning algorithm, a second learning algorithm is described: the enhanced learning algorithm. The enhanced learning algorithm incorporates additional regularization to the pattern of asymmetry to learn the ground truth in a robust way. The enhanced learning algorithm is able to learn path asymmetry well in all cases. Further, its performance is independent to the distribution of the asymmetry, the number of connections, or the amplitude of asymmetry. These features make the enhanced learning algorithm work well even with a small number of connections and large path asymmetry. The enhanced learning algorithm may learn all types of path asymmetry, including both static and dynamic asymmetry. The enhanced learning algorithm may suitable for real time learning, and the learned asymmetry may further be used to perform clock correction and time synchronization. Accordingly, the techniques of the disclosure obviate the need to calibrate clocks of a network system manually or periodically.

Figure 9:
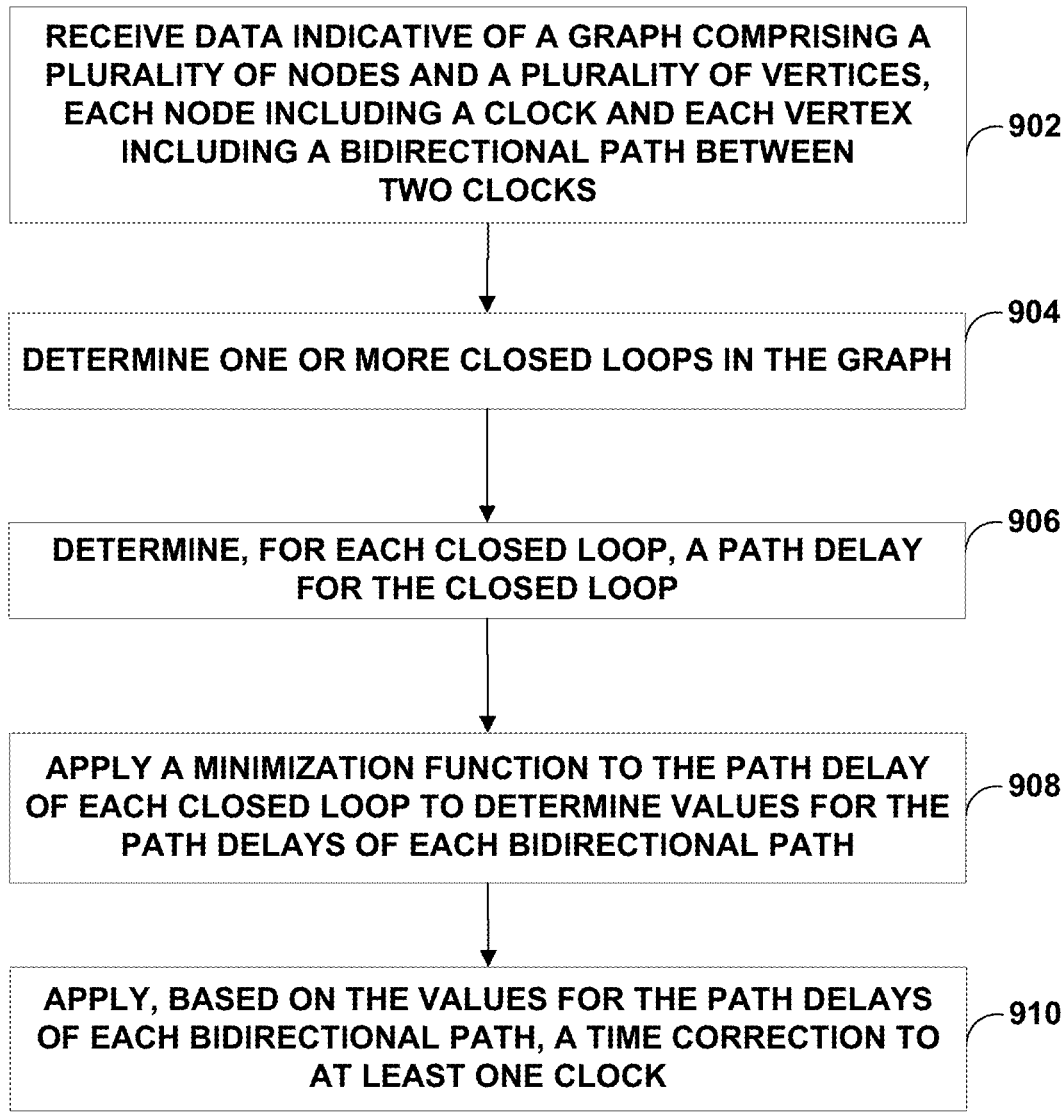
FIG. 9 is a flowchart illustrating an example operation for performing time synchronization for a plurality of computing devices that exhibit asymmetric path delay between the plurality of computing devices in accordance with the techniques of the disclosure.

FIG. 9 is a flowchart illustrating an example operation for performing time synchronization for a plurality of computing devices that exhibit asymmetric path delay between the plurality of computing devices in accordance with the techniques of the disclosure. For convenience, FIG. 9 is described with respect to FIGS. 1 and 2.

In the example of FIG. 9, processing circuitry 205 receives data indicative of a graph comprising a plurality of nodes and a plurality of vertices (902). Each node of the plurality of nodes of the graph includes, and may represent, a clock of a computing device of a plurality of computing devices 102. Each vertex of the plurality of vertices of the graph represents a bidirectional path between clocks of two computing devices 102. Each bidirectional path has associated with it a first path delay in a first direction of the bidirectional path between the two computing devices 102 that is different from an associated second path delay in a second direction of the bidirectional path between the two computing devices 102.

Processing circuitry 205 determine one or more closed loops in the graph (904). Each closed loop describes a traversal of the graph that includes at least a unidirectional path from a first clock of a first computing device 102 to a second clock of a second computing device 102 and a unidirectional path from the second clock to the first clock. In some examples, a closed loop includes paths between clocks of at least two computing devices 102. In some examples, a closed loop includes paths between clocks of at least three computing devices 102. In some examples, a closed loop traverses clocks of a plurality of computing devices 102 in a clockwise path on the graph. In some examples, a closed loop traverses clocks of a plurality of computing devices 102 in a counterclockwise path on the graph. Further, processing circuitry 205 determines, for each closed loop of the one or more closed loops in the graph, a path delay of the closed loop (906). In some examples, the path delay is at least one of a value of $d_{ij}$ for $d_{ij}=w_{ij}[(t_2-t_1)+(t_4-t_3)]$ and a value of $d_{ji}$ for $d_{ji}=w_{ji}[(t_2-t_1)+(t_4-t_3)]$ for the closed loop.

Processing circuitry 205 applies a minimization function to the path delay of each closed loop of the one or more closed loops to determine values for the first path delay and the second path delay of each bidirectional path represented by each vertex of the graph (908). In some examples, the minimization function is $loss_H(W)=loss_J+\lambda(W-0.5)^2$. In one example, the minimization function is a gradient descent algorithm. In another example, the minimization function is a machine learning system or neural network.

Processing circuitry 205 applies, based on the values for the first path delay and the second path delay of each bidirectional path represented by each vertex of the graph, a time correction to correct a clock offset of at least one clock of the plurality of computing devices 102 (910). In some examples, the clock offset is a value of $\sigma_{ij}$ for $\sigma_{ij}=(1-w_{ij})(t_2-t_1)-w_{ij}(t_4-t_3)$. For example, based on the values for the path delay in each direction of each bidirectional path, processing circuitry 205 calculates a time synchronization offset value. Further, processing circuitry 205 applies a time correction to at least one clock of the plurality of clocks based on the offset value. In some examples, processing circuitry 205 sends data including the values for the first path delay and the second path delay of each bidirectional path represented by each vertex of the graph to another computing device 102. The other computing device 102 may use the data to determine the time correction to the at least one clock and/or apply the time correction to the at least one clock.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A method for time synchronization for a plurality of clocks on a network, the method comprising:

receiving, by processing circuitry of a computing device, data indicative of a graph comprising a plurality of nodes and a plurality of vertices, wherein each node includes a clock of the plurality of clocks and each vertex includes a bidirectional path between two clocks of the plurality of clocks, and wherein the bidirectional path is associated with a first path delay in a first direction of the bidirectional path between the two clocks that is different from a second path delay in a second direction of the bidirectional path between the two clocks;

determining, by processing circuitry, a plurality of closed loops in the graph, each of the plurality of closed loops representing a traversal of the graph starting from a node of the plurality of nodes and returning to the node of the plurality of nodes;

determining, by the processing circuitry and for each closed loop of the plurality of closed loops in the graph, a path delay for the closed loop;

applying, by the processing circuitry, a minimization function to the path delay for each closed loop of the plurality of closed loops to determine respective values for each of the first path delay and the second path delay for each bidirectional path represented by each vertex of the graph; and applying, by the processing circuitry and based on the respective values for each of the first path delay and the second path delay of each bidirectional path represented by each vertex of the graph, a time correction to correct a clock offset of at least one of the plurality of clocks.

2. The method of claim 1, wherein applying the minimization function to the path delay of each of the plurality of closed loops to determine the respective values for each of the first path delay and the second path delay of each bidirectional path represented by each vertex of the graph comprises applying a machine learning system to the path delay of each of the plurality of closed loops to determine the respective values for each of the first path delay and the second path delay of each bidirectional path represented by each vertex of the graph.

3. The method of claim 1, wherein applying the minimization function to the path delay of each of the plurality of closed loops to determine the respective values for each of the first path delay and the second path delay of each bidirectional path represented by each vertex of the graph comprises applying a gradient descent algorithm to the path delay of each of the plurality of closed loops to determine the respective values for each of the first path delay and the second path delay of each bidirectional path represented by each vertex of the graph.

4. The method of claim 1, further comprising applying, by the processing circuitry, a normalizing function to the plurality of closed loops to generate a plurality of normalized loops, wherein applying the minimization function to the path delay of each of the plurality of closed loops to determine respective values for each of the first path delay and the second path delay of each bidirectional path represented by each vertex of the graph comprises applying the minimization function to a path delay of each of the plurality of normalized loops to determine respective values for each of the first path delay and the second path delay of each bidirectional path represented by each vertex of the graph.

5. The method of claim 1, wherein the plurality of closed loops in the graph comprise at least: a first loop representing a clockwise traversal of the graph starting from a first node of the plurality of nodes, including at least two other nodes of the plurality of nodes, and returning to the first node of the plurality of nodes; and a second loop representing a counterclockwise traversal of the graph starting from the first node, including the at least two other nodes, and returning to the first node.

6. The method of claim 1, wherein the plurality of clocks comprises a reference clock and a plurality of slave clocks, and wherein applying the time correction to at least one of the plurality of clocks comprises applying the time correction to at least one of the plurality of slave clocks to synchronize the at least one of the plurality of slave clocks with the reference clock.

7. The method of claim 1, wherein determining, for each closed loop of the plurality of closed loops in the graph representing a traversal of the graph, the path delay of the closed loop comprises determining, for each of the plurality of closed loops in the graph, at least one of a value of $d_{ij}$ for $d_{ij}=w_{ij}[(t_2-t_1)+(t_4-t_3)]$ or a value of $d_{ji}$ for $d_{ji}=w_{ji}[(t_2-t_1)+(t_4-t_3)]$ for the closed loop, wherein applying the minimization function to the path delay of each closed loop of the plurality of closed loops to determine respective values for each of the first path delay and the second path delay of each bidirectional path represented by each vertex of the graph comprises minimizing a loss function, $loss_H(W)=loss_I+A(W-0.5)^2$, for each closed loop of the plurality of closed loops to determine the respective values for each of the first path delay and the second path delay of each bidirectional path represented by each vertex of the graph, wherein applying, based on the respective values for each of the first path delay and the second path delay of each bidirectional path represented by each vertex of the graph, a time correction to correct a clock offset of at least one of the plurality of clocks comprises determining a value of $\sigma_{ij}$ for $\sigma_{ij}=(1-w_{ij})(t_2-t_1)-w_{ij}(t_4-t_3)$, wherein i is a first clock of the plurality of clocks and included by a first node of the plurality of nodes of the graph, wherein j is a second clock of the plurality of clocks and included by a second node of the plurality of nodes of the graph, wherein $d_{ij}$ is a path delay from the first clock to the second clock, wherein $d_{ji}$ is a path delay from the second clock to the first clock, wherein $\sigma_{ij}$ is a difference in a clock time between the first clock and the second clock, wherein $w_{ij}$ is a ratio of the path delay from the first clock to the second clock to a total path delay of the traversal of the graph, wherein $w_{ji}$ is a ratio of the path delay from the second clock to the first clock to a total path delay of the traversal of the graph, wherein $t_1$ is a time at which the first clock sends a first reference timing signal to the second clock, wherein $t_2$ is a time at which the second clock receives the first reference timing signal, wherein $t_3$ is a time at which the second clock sends a second reference timing signal to the first clock, and wherein $t_4$ is a time at which the first clock receives the second reference timing signal.

8. The method of claim 1, wherein each traversal of the graph represented by each closed loop of the plurality of closed loops starts from the node of the plurality of nodes and traverses at least two other nodes of the plurality of nodes before returning to the clock.

9. The method of claim 1, wherein the first path delay in the first direction between the two clocks comprises a first static path delay and a first dynamic path delay in the first direction between the two clocks, wherein the second path delay in the second direction between the two clocks comprises a second static path delay and a second dynamic path delay in the second direction between the two clocks, and wherein applying the minimization function to the path delay of each closed loop of the plurality of closed loops to determine respective values for each of the first path delay and the second path delay of each bidirectional path represented by each vertex of the graph comprises applying the minimization function to the path delay of each closed loop of the plurality of closed loops to determine respective values for each of the first static path delay, the first dynamic path delay, the second static path delay, and the second dynamic path delay of each bidirectional path represented by each vertex of the graph.

10. The method of claim 1, wherein applying the time correction to correct the clock offset of the at least one of the plurality of clocks comprises: determining, by the processing circuitry and based on the respective values for each of the first path delay and the second path delay of each bidirectional path represented by each vertex of the graph, the time correction; and applying the determined time correction to the at least one of the plurality of clocks to synchronize the at least one of the plurality of clocks with at least one other clock of the plurality of clocks.

11. The method of claim 1, wherein applying the time correction to the at least one of the plurality of clocks comprises sending data including the respective values for each of the first path delay and the second path delay of each bidirectional path represented by each vertex of the graph to a second computing device for use in determining the time correction to the at least one of the plurality of clocks.

12. A computing device comprising:
a storage medium; and
processing circuitry configured to:
receive data indicative of a graph comprising a plurality of nodes and a plurality of vertices, wherein each node includes a clock of a plurality of clocks and each vertex includes a bidirectional path between two clocks of the plurality of clocks, and wherein the bidirectional path is associated with a first path delay in a first direction of the bidirectional path between the two clocks that is different from a second path delay in a second direction of the bidirectional path between the two clocks;
determine a plurality of closed loops in the graph, each of the plurality of closed loops representing a traversal of the graph starting from a node of the plurality of nodes and returning to the node of the plurality of nodes;
determine, for each closed loop of the plurality of closed loops in the graph, a path delay for the closed loop;
apply a minimization function to the path delay for each closed loop of the plurality of closed loops to determine respective values for each of the first path delay and the second path delay for each bidirectional path represented by each vertex of the graph; and
apply, based on the respective values for each of the first path delay and the second path delay of each bidirectional path represented by each vertex of the graph, a time correction to correct a clock offset of at least one of the plurality of clocks.

13. The computing device of claim 12, wherein to apply the minimization function to the path delay of each of the plurality of closed loops to determine the respective values for each of the first path delay and the second path delay of each bidirectional path represented by each vertex of the graph, the processing circuitry is further configured to apply a machine learning system to the path delay of each of the plurality of closed loops to determine the respective values for each of the first path delay and the second path delay of each bidirectional path represented by each vertex of the graph.

14. The computing device of claim 12, wherein to apply the minimization function to the path delay of each of the plurality of closed loops to determine the respective values for each of the first path delay and the second path delay of each bidirectional path represented by each vertex of the graph, the processing circuitry is further configured to apply a gradient descent algorithm to the path delay of each of the plurality of closed loops to determine the respective values for each of the path delay and the second path delay of each bidirectional path represented by each vertex of the graph.

15. The computing device of claim 12, wherein the processing circuitry is further configured to apply a normalizing function to the plurality of loops to generate a plurality of normalized loops, and wherein to apply the minimization function to the path delay of each of the plurality of closed loops to determine the respective values for each of the first path delay and the second path delay of each bidirectional path represented by each vertex of the graph, the processing circuitry is further configured to apply the minimization function to a path delay of each of the plurality of normalized loops to determine respective values for each of the first path delay and the second path delay of each bidirectional path represented by each vertex of the graph.

16. The computing device of claim 12, wherein the plurality of closed loops in the graph comprise at least: a first loop representing a clockwise traversal of the graph starting from a first node of the plurality of nodes, including at least two other nodes of the plurality of nodes, and returning to the first node of the plurality of nodes; and a second loop representing a counterclockwise traversal of the graph starting from the first node, including the at least two other nodes, and returning to the first node.

17. The computing device of claim 12, wherein the plurality of clocks comprises a reference clock and a plurality of slave clocks, and wherein to apply the minimization function to the path delay of each of the plurality of closed loops to determine the respective values for each of the first path delay and the second path delay of each bidirectional path represented by each vertex of the graph, the processing circuitry is further configured to apply the time correction to at least one of the plurality of slave clocks to synchronize the at least one of the plurality of slave clocks with the reference clock.

18. The computing device of claim 12, wherein to determine, for each closed loop of the plurality of closed loops in the graph representing a traversal of the graph, the path delay of the closed loop, the processing circuitry is configured to determine, for each of the plurality of closed loops in the graph, at least one of a value of $d_{ij}$ for $d_{ij}=w_{ij}[(t_2-t_1)+(t_4-t_3)]$ or a value of $d_{ji}$ for $d_{ji}=w_{ij}[(t_2-t_1)+(t_4-t_3)]$ for the closed loop, wherein to apply the minimization function to the path delay of each closed loop of the plurality of closed loops to determine respective values for each of the first path delay and the second path delay of each bidirectional path represented by each vertex of the graph, the processing circuitry is configured to minimize a loss function, $loss_{II}(W)=loss_I+A(W-0.5)^2$, for each closed loop of the plurality of closed loops to determine the respective values for each of the first path delay and the second path delay of each bidirectional path represented by each vertex of the graph, wherein to apply, based on the respective values for each of the first path delay and the second path delay of each bidirectional path represented by each vertex of the graph, a time correction to correct a clock offset of at least one of the plurality of clocks, the processing circuitry is configured to determine a value of $\sigma_{ij}$ for $\sigma_{ij}=(1-w_{ij})(t_2-t_1)-w_{ij}(t_4-t_3)$, wherein i is a first clock of the plurality of clocks and included by a first node of the plurality of nodes of the graph, wherein j is a second clock of the plurality of clocks and included by a second node of the plurality of nodes of the graph, wherein dg is a path delay from the first clock to the second clock, wherein $d_{ji}$ is a path delay from the second clock to the first clock, wherein $\sigma_{ij}$ is a difference in a clock time between the first clock and the second clock,
wherein $w_{ij}$ is a ratio of the path delay from the first clock to the second clock to a total path delay of the traversal of the graph,
wherein $w_{ji}$ is a ratio of the path delay from the second clock to the first clock to a total path delay of the traversal of the graph, wherein $t_1$ is a time at which the first clock sends a first reference timing signal to the second clock, wherein $t_2$ is a time at which the second clock receives the first reference timing signal, wherein $t_3$ is a time at which the second clock sends a second reference timing signal to the first clock, and wherein $t_4$ is a time at which the first clock receives the second reference timing signal.

19. The computing device of claim 12, wherein each traversal of the graph represented by each closed loop of the plurality of closed loops starts from the node of the plurality of nodes and traverses at least two other nodes of the plurality of nodes before returning to the clock.

20. A non-transitory computer-readable medium comprising instructions that, when executed, cause processing circuitry of a computing device to: receive data indicative of a graph comprising a plurality of nodes and a plurality of vertices, wherein each node includes a clock of a plurality of clocks and each vertex includes a bidirectional path between two clocks of the plurality of clocks, and wherein the bidirectional path is associated with a first path delay in a first direction of the bidirectional path between the two clocks that is different from a second path delay in a second direction of the bidirectional path between the two clocks; determine a plurality of closed loops in the graph, each of the plurality of closed loops representing a traversal of the graph starting from a node of the plurality of nodes and returning to the node of the plurality of nodes;

determine, for each closed loop of the plurality of closed loops in the graph, a path delay for the closed loop;

apply a minimization function to the path delay for each closed loop of the plurality of closed loops to determine respective values for each of the first path delay and the second path delay for each bidirectional path represented by each vertex of the graph; and apply, based on the respective values for each of the first path delay and the second path delay of each bidirectional path represented by each vertex of the graph, a time correction to correct a clock offset of at least one of the plurality of clocks.

21. The method of claim 1, wherein each of the plurality of closed loops traverses at least three nodes of the plurality of nodes.

* * * * *